US010534613B2

(12) United States Patent
Keskin et al.

(10) Patent No.: US 10,534,613 B2
(45) Date of Patent: Jan. 14, 2020

(54) SUPPORTING LEARNED BRANCH PREDICTORS

(71) Applicant: Intel Corporation, Santa Clara, CA (US)

(72) Inventors: Gokce Keskin, Sunnyvale, CA (US); Stephen J. Tarsa, Cambridge, MA (US); Gautham N. Chinya, Portland, OR (US); Tsung-Han Lin, Campbell, CA (US); Perry H. Wang, San Jose, CA (US); Hong Wang, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 242 days.

(21) Appl. No.: 15/581,791

(22) Filed: Apr. 28, 2017

(65) Prior Publication Data
US 2018/0314524 A1 Nov. 1, 2018

(51) Int. Cl.
G06F 9/38 (2018.01)
G06N 3/08 (2006.01)

(52) U.S. Cl.
CPC .............. G06F 9/3806 (2013.01); G06N 3/08 (2013.01)

(58) Field of Classification Search
CPC ................................ G06F 9/3806; G06N 3/08
See application file for complete search history.

(56) References Cited

U.S. PATENT DOCUMENTS 9,442,726 B1 *  9/2016  Bonanno ............... G06F 9/3806
2018/0293076 A1 * 10/2018  Sadasivam ........... G06F 9/3806

* cited by examiner

Primary Examiner — Zachary K Huson
(74) Attorney, Agent, or Firm — Lowenstein Sandler LLP

(57) ABSTRACT

Implementations of the disclosure provide a processing device comprising a branch predictor circuit to obtain a branch history for an application. The branch history comprising references to branching instructions associated with the application and an outcome of executing each branch. Using the branch history, a neutral network is trained to produce a weighted value for each branch of the branching instructions. Features of the branching instructions are identified based on the weighted values. Each feature identifying predictive information regarding the outcome of at least one branch of correlated branches having corresponding outcomes. A feature vector is determined based on the features. The feature vector comprises a plurality of data fields that identify an occurrence of a corresponding feature of the correlated branches with respect to the branch history. Using the feature vector, a data model is produced to determine a predicted outcome associated with the correlated branches.

20 Claims, 13 Drawing Sheets

SUPPORTING LEARNED BRANCH PREDICTORS

TECHNICAL FIELD

Embodiments of the disclosure relate generally to microprocessors and more specifically, but without limitation, for supporting learned branch predictors.

BACKGROUND

To maximize performance, modern processors attempt to execute as many instructions as possible concurrently. To identify enough instructions to keep busy, the processors may use branch prediction to determine which instructions will most likely be executed in a certain processor pipeline. As a result, branch prediction may eliminate the need to wait for the outcome of branch instructions and therefore keep the processor pipeline as full as possible.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
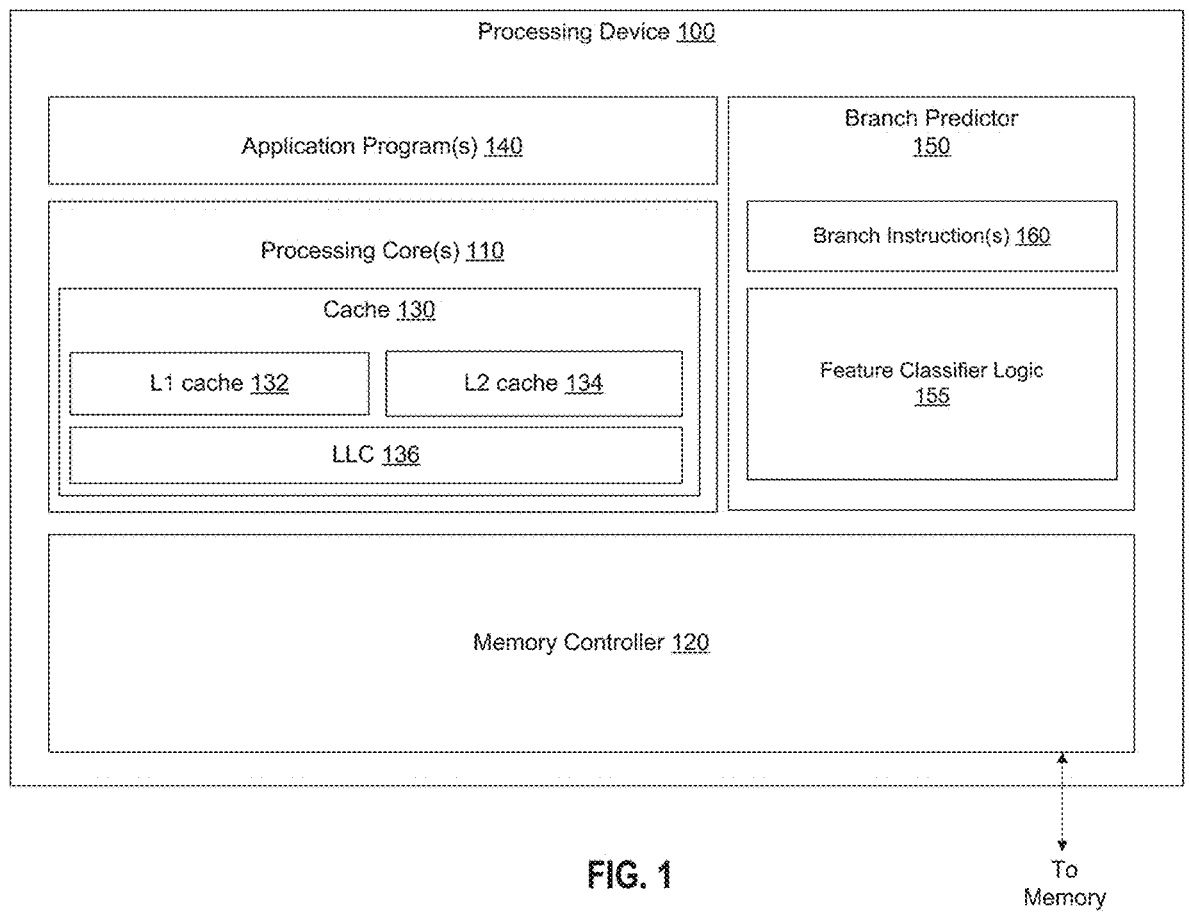
FIG. 1 illustrates a block diagram of a processing device for supporting learned branch predictors according to one embodiment.

A branching instruction is an instruction in an application program that can cause a processor to begin executing a different instruction sequence and thus deviates from its default behavior of executing instructions in order. A branch predictor may attempt to identify the outcome (e.g., the next instruction to execute) of a branch instruction in the application program by determining whether the branch is likely to be taken or not. Branch prediction accuracy is very important to ensure the high performance of processors. Even small increases in prediction accuracy can translate to big improvements in processor performance. In that regard, some branch prediction components may utilize a branch history (e.g., in a table or other types of data structures) that includes the outcomes of previously executed branches. Branch prediction techniques may rely on the identification of correlations between a current branch and prior branch outcomes in the branch history to predict the current outcome of a branch.

In one example of a branch prediction technique, partial pattern matching (PPM) predictors may record the outcomes of N (e.g., a determined number) branches preceding a current branch. The PPM predictors may then predict a branch outcome of the current branch based on the longest matching pattern of recorded outcomes of the preceding braches. For example, if the N-long pattern of outcomes has been seen before and recorded in the branch history, the outcome the current branch is predicted to be the same as the last time this N-long pattern was observed. Loop predictors can detect the existence of loops associated with the branch outcomes of the braches, and can base their prediction on the number of times the loop was previously executed. Perceptron-based predictors may identify previous branch outcomes associated with the braches. The predictors may then multiply each outcome with a weighted value (e.g., indicating the likelihood that the branch will be taken), and sum the results of the multiplications. The prediction is then based on the value of the sum, for example, if the sum is greater than a certain threshold, the branch is predicted as taken (or vice versa).

Some branch prediction techniques can perform poorly, if the correlated branches are separated, for example, by many paths made up of uncorrelated branches. In that regard, the correlated branches are branches with outcomes that have a tendency to move in tandem with each other either in the same direction or opposite directions. For example, if a branch predictor is attempting to predict the outcome of a given branch (B1), it may analyze the past N branch outcomes that have already occurred in the branch history. In this instance, there may be a branch, named B2, in this N-long branch history and when B2 is taken, B1 is always taken. This indicates that B1 and B2 are correlated, because their outcomes move in tandem in the same direction. In another case, if B1 is taken whenever B2 is "not taken", they are still correlated because they are moving in tandem but toward opposite directions. There might also be a branch B3 in the branch history that has no clear correlation to the outcome of B1. This may mean that B1 and B3 are uncorrelated branches. Correlation, however, does not directly represent causation. For example, in the example above B2 might not be the cause for the outcome of B1. For example, if B1 checks whether numbers X and Y are equal, and B1 is "taken" when they are. Assume B2 checks the same condition. In this case, B1 and B2 are correlated because their outcomes are in tandem, but the actual causation (or dependence) is dependent on the values of X and Y.

The branch history stored by the branch predictor is a global shared history of paths taken by all conditional branches during the execution of an application program. A path may represent a repeatable pattern, such as a sequence of instructions leading to a current branch. Many branches in the global shared history are correlated (e.g., moving in tandem with each other) with control flow streams that pass through different paths in the program. A disadvantage, however, of the global shared history is that it can be diluted by including irrelevant information regarding uncorrelated branches. In some situations, a path through these uncorrelated branches may be taken between the executions of the correlated branches. As such, the presence of these uncorrelated branches in the branch history is analogous to "noise" (unwanted irrelevant data) making the branch prediction more difficult and inaccurate, which can adversely affect system performance.

Embodiments of the disclosure address the above-mentioned and other deficiencies by combining "offline" training to identify correlated branches with further "online" training to classify certain branches to improve branch prediction accuracy in microprocessors. In that regard, "offline" training may refer to processing a static dataset while "online" training may refer to processing a dataset as information about the dataset comes in. In embodiments, a branch predictor also referred to as a branch predictor circuit (e.g., hardware component, circuitry, dedicated logic, programmable logic, microcode, etc.) may be implemented in a processor to provide the benefits of the techniques of the disclosure. The branch predictor circuit may also include logic that uses the combined "offline" and "online" training to predict outcomes for certain branches.

In operation, the branch predictor circuit may identify branch instructions in a given application program using a sample trace of that program. In some embodiments, a neural network, such as a convolutional neural network is then trained "offline", using a branch history data for these particular branches, to determine if any improvements in prediction accuracy can be achieved. The term "neural network," as used herein refers to a computer-implemented model designed to simulate the behavior of biological neural networks, e.g., for pattern recognition. In some embodiments, the neural network may be implemented as computer readable program instructions, e.g., as program code and data organized as a functional data structure, stored in a computer readable storage medium or hardware component or some combination thereof.

A neural network receives an input (a single vector), and transforms it through a series of layers. Each hidden layer includes a set of neurons (processing nodes) that have learnable weights and user defined parameters. The last layer is called the "output layer." The neural network may be used to extract "features" (e.g., patterns in the branch history that have predictive information about the outcome of the current branch) from complex input data (such as the branch history data) and assign learned weights to those features. For example, going back to the example of B1 and B2 above, the outcome of B2 is a "feature" because its outcome can help predict B1 accurately. On the other hand, B3 is not a feature, because the outcome of B3 does not indicate anything about the outcome of B1. In general, there may be more than one unique "feature" in the history.

The learned weights may be values representing how likely the outcome of a given branch is a feature, where a feature is a pattern in the incoming data that contains information highly correlated to the outcome of another branch. Once a set of input data (e.g., branch history data) for the neural network is developed, the neural network can be trained (using certain learning algorithms) to create a network of associations between features of the input data and outcomes of the branches. For example, the neural network can be organized in a number of layers, where the output of one layer can be fed as input to the next layer. During the training process, the neural network may determine a set of weights for the identified features that provides the neural network with a desired input-output relationship of the layers.

Once the branch predictor circuit inputs the branch history data into the neural network, the learned weights from the neural network are used to identify the correlated branches (features) from the branch history. These correlated branches may be the most heavily weighted branches as determined by the neural network that is the braches having an absolute weight value meeting a certain minimum threshold value. As a result of the identification, the uncorrelated branches are pruned out or otherwise removed from processing by the branch predictor circuit. These features (e.g., correlated branches) are used to build a feature vector that is a vector of a certain length matching the number of features selected from the branch history. Each element of the vector may identify a location of one of the features in the branch history. In some implementations, a different vector may contain a number of times a feature is present in the history. There could be other potential ways of building a vector as well.

The branch predictor circuit uses the feature vector to build an "online" classification data model, such as a decision tree, to predict current branch outcomes. For example, the classification data model is used to predict the outcome of the correlated branches without interference from the uncorrelated branches. Although aspects of the disclosure may describe using a decision tree as the "online" classification data model, other types of data structures or techniques may be used. After the "online" classification data model is build, it may be implemented by the processor and/or processing logic for "hard" to predict branches that is braches with outcomes are not predicted accurately with traditional approaches.

FIG. 1 illustrates a block diagram of a processing device 100 for supporting learned branch predictors according to one embodiment. The processing device 100 may be generally referred to as "processor" or "CPU". "Processor" or "CPU" herein shall refer to a device capable of executing instructions encoding arithmetic, logical, or I/O operations. In one illustrative example, a processor may include an arithmetic logic unit (ALU), a control unit, and a plurality of registers. In a further aspect, a processor may include one or more processing cores, and hence may be a single core processor which is typically capable of processing a single instruction pipeline, or a multi-core processor which may simultaneously process multiple instruction pipelines. In another aspect, a processor may be implemented as a single integrated circuit, two or more integrated circuits, or may be a component of a multi-chip module (e.g., in which individual microprocessor dies are included in a single integrated circuit package and hence share a single socket).

As shown in FIG. 1, processing device 100 may include various components. In one embodiment, processing device 100 may include one or more processors cores 110 and a memory controller unit 120, among other components, coupled to each other as shown. The processing device 100 may also include a communication component (not shown) that may be used for point-to-point communication between various components of the processing device 100. The processing device 100 may be used in a computing system (not shown) that includes, but is not limited to, a desktop computer, a tablet computer, a laptop computer, a netbook, a notebook computer, a personal digital assistant (PDA), a server, a workstation, a cellular telephone, a mobile computing device, a smart phone, an Internet appliance or any other type of computing device. In another embodiment, the processing device 100 may be used in a system on a chip (SoC) system. In one embodiment, the SoC may comprise processing device 100 and a memory. The memory for one such system is a DRAM memory. The DRAM memory can be located on the same chip as the processor and other system components. Additionally, other logic blocks such as a memory controller or graphics controller can also be located on the chip.

The processor core(s) 110 may execute instructions for the processing device 100. The instructions may include, but are not limited to, pre-fetch logic to fetch instructions, decode logic to decode the instructions, execution logic to execute instructions and the like. The computing system may be representative of processing systems based on the Pentium® family of processors and/or microprocessors available from Intel® Corporation of Santa Clara, Calif., although other systems (including computing devices having other microprocessors, engineering workstations, set-top boxes and the like) may also be used. In one embodiment, a sample computing system may execute a version of an operating system, embedded software, and/or graphical user interfaces. Thus, embodiments of the disclosure are not limited to any specific combination of hardware circuitry and software.

In an illustrative example, processing core 110 may have a micro-architecture including processor logic and circuits. Processor cores with different micro-architectures can share at least a portion of a common instruction set. For example, similar register architectures may be implemented in different ways in different micro-architectures using various techniques, including dedicated physical registers, one or more dynamically allocated physical registers using a register renaming mechanism (e.g., the use of a register alias table (RAT), a reorder buffer (ROB) and a retirement register file).

Memory controller 120 may perform functions that enable the processing device 100 to access and communicate with memory (not shown) that includes a volatile memory and/or a non-volatile memory. In some embodiments, the memory controller 120 may be located on a processor die associated with processing device 100, while the memory is located off the processor die. In some embodiments, the processing device 100 includes a cache unit 130 to cache instructions and/or data. The cache unit 130 includes, but is not limited to, a level one (L1) 132, level two (L2) 134, and a last level cache (LLC) 136, or any other configuration of the cache memory within the processing device 100. In some embodiments, the L1 cache 132 and L2 cache 134 can transfer data to and from the LLC 136. In one embodiment, the memory controller 120 can be connected to the LLC 136 to transfer data between the cache unit 130 and memory. As shown, the cache unit 130 can be integrated into the processing cores 110. The cache unit 130 may store data (e.g., including instructions) that are utilized by one or more components of the processing device 100.

In some embodiments, the processing device 100 may execute one or more application programs 140 (e.g., a user-level multithreaded application). Such application programs 140 may be executed by system software (not shown) installed at the processing device 100. Examples of system software include, but are not limited to, one or more operating systems, a virtual machine monitor (VMM), a hypervisor, and the like, and combinations thereof. The application programs 140 may use instructions (e.g., branch instructions 160) to control the processing device 100 as disclosed herein. The instructions may represent macroinstructions, assembly language instructions, or machine-level instructions that are provided to the processing core 110 for execution.

In some embodiments, the processing device 100 implements a branch predictor 150 also referred to as a branch predictor circuit to predict the current outcome of a branch instruction 160. In some embodiments, the branch predictor 150 may be implemented as part of the processing device 100. In alternative embodiments, the branch predictor 150 may be implemented in a separate hardware component, circuitry, dedicated logic, programmable logic, microcode of the processing device 100 or any combination thereof. In some embodiments, the branch predictor 150 may include a dedicated portion of the same processor logic and circuits executed by the processing cores 110. For example, the branch predictor 150 may include feature classifier logic 155 to improve on the prediction accuracy of the predictor 150 by using a combination of "offline" training to identify correlated branches with further "online" training to classify certain hard to predict branches. In that regard, "offline" training may refer to processing a static dataset while "online" training may refer to processing a dataset as data comes.

In operation, an architectural simulator (not shown) may extract a sample trace of an application program 140. This trace includes all instructions executed by the processing device 100, including a plurality of the conditional branches 160 which are also stored in a branch history. The outcomes of the branches 160 are also included in this trace of the application program 140. The processing device 100 may identify poorly predicted or hard to predict branches (H2P). A hard to predict branch (H2P) is a branch whose outcome some branch predictors cannot predict with high accuracy. To identify the H2Ps, the processing device 100 examines the trace data to identify branches that may perform poorly under current branch prediction techniques. A neural network is used to train weights that identify the correlated branches (features) in the history of H2Ps. To generate a prediction for the H2P, the branch predictor 150 selects only branches that were identified as features.

Using the feature classifier logic 155, a neural network (not shown) is trained "offline" based on the history data of poor-performing branches (e.g. H2Ps). For example, the branch predictor 150 inputs into the neural network the sequence of branch instructions prior to one of the H2P branches and their outcomes (taken/not taken) from the branch history. The branch predictor 150 identifies the correlated branches (features) in the branch history by looking at the weights learned by the neural network during the training. In this regard, the branch predictor 150 selects the most heavily weighted branches in the branch history that is those weights meet a certain threshold value. By selecting the most heavily weighted branches, the branch predictor 150 prunes out the uncorrelated branches in the branch history in order to reduce the strain on subsequent "online" classification training for predicting current branches. Once the most heavily weighted branches are selected, the branch predictor 150 builds a feature vector from the identified features, which are used during the "online" classification training. The details of building feature vector are further discussed below.

Figure 2:
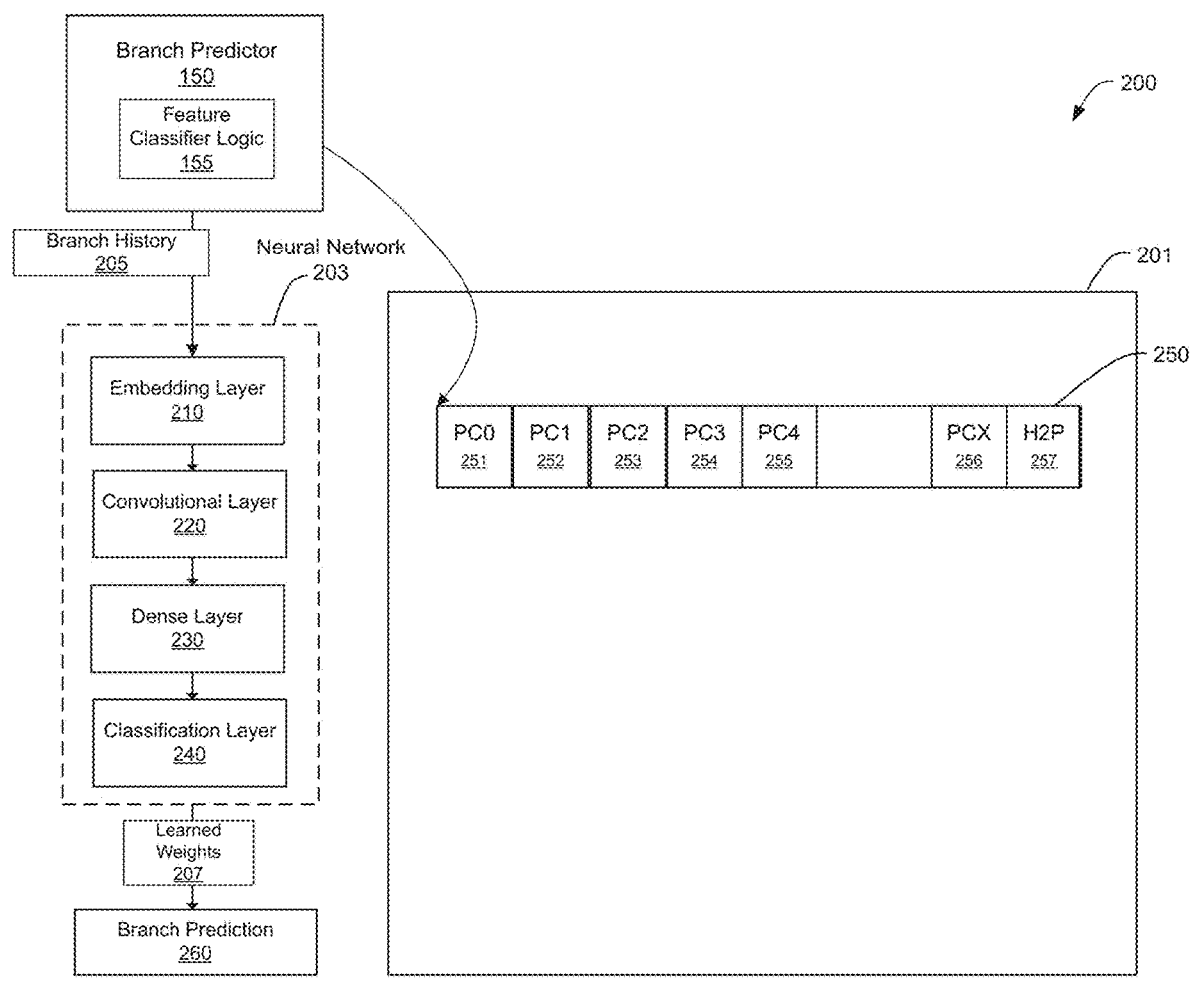
FIG. 2 illustrates a block diagram of a system including a memory to support learned branch predictors according to one embodiment.

FIG. 2 illustrates a block diagram of a system 200 including a memory 210 for supporting learned branch predictors according to one embodiment. In this example, system 200 includes the branch predictor 150 of processing device 100 of FIG. 1. The branch predictor 150 further implements feature classifier logic 155 to improve the accuracy of branch prediction by the predictor 150. In one embodiment, the system 200 extracts an instruction trace 250 of a sample application program using, for example, an architectural simulator. Indications of whether branches were actually taken or not taken are also sent to global history or branch history 205, which may be a data structure (e.g., a table or array) stored in memory 210. For example, certain branches execute repetitive patterns, which can be detected if the immediate history of the branch is known. As such, the branch predictor 150 may store recent history of the braches taken by the trace 250 in the history 205. The history 205 may include, for example, information for the branch instruction address after a branch is executed during the trace 250 and the direction taken to another address in the history 205

The extracted trace 250 contains executed instructions, their program counter values and the outcome of branching events. For example, a series of branching instructions 251-256 of the trace 250 with different program counters (PC) are shown in FIG. 2 stored in memory 210. In some embodiments, the PC is a hardware register storing the address of the next instruction to be executed. The program counter values indicate where a processing device, such as processing device 100, is in its execution of a program sequence of instructions. For example, the PC comprises the memory address of the next instruction that would be executed. Each PC value in the history may be replaced with two unique integer values, where a first integer (for example to a value of "1") encodes that a branch taken event for that PC value or with a second integer (for example to a value of "0") that encodes a branch not taken event for that PC value.

In this example, PC0 251 is the earliest occurring branch, and the last event is a hard to predict branch (H2P) 257 that the system is to predict. Outcomes (such as whether a branch instruction is taken or not) of all branches PC0 to PCX are known based on the simulated trace of the program. If branch H2P 257 is only taken when both PC0 251 and PC1 252 are taken, and not taken in all other cases, H2P 257 is then completely correlated to PC0 251 and PC1 252. As such, branch instructions PC2 253 through PCX 256 are uncorrelated to H2P. If the outcomes of PC2 253 to PCX 256 are completely random, these uncorrelated branches may corrupt the global outcome history (e.g., branch history 205) associated with the branch instructions. Moreover, as the separation distance between the correlated branches (PC0 251 and PC1 252) and H2P 257 increases, the number of unique paths between them may increase exponentially.

In some embodiments, a neural network 203 (such as a convolutional neural network) is trained based on these hard to predict branches, such as H2P 257. The term "neural network," as used herein refers to a computer-implemented model designed to simulate the behavior of biological neural networks, as in pattern recognition. In some embodiment, the neural network 203 may be implemented as computer readable program instructions, e.g., as program code and data organized as a functional data structure, stored in a computer readable storage medium or hardware component or some combination thereof. This neural network 203 may be used to extract "features" from complex input data (such as the branch history data 205) and assign learned weights to those features.

In some embodiments, the neural network 203 can be organized in a number of layers 210-240, where the output of one layer can be fed as input to the next layer. Each layer of the neural network 203 is made up of "neurons" also referred to as processing nodes that have learnable weights and user defined parameters. A neuron is the basic building block of neural networks. These neurons form a layer that has a set of weights, and these weights and the input data are used to generate an output. Each layer of the network 203 generates an output from a received input in accordance with current values of a respective set of parameters. Multiple neurons can operate on the same input data. The output of a layer of neurons can be connected as input to a second layer of neurons forming, for example, a two layer neural network. Multi-layer neural networks, or deep neural networks, are networks that have multiple layers of neurons. For ease of explanation, the functioning of the neural network 203 in accordance with an embodiment will be explained below. However, as would be understood by a person having ordinary skill in the art, other types of neural networks can be used.

As shown in FIG. 2, the neural network 203 may comprise an embedding layer 210 to accept complex input data, a convolutional layer 220 to generate output based on one or more filters and the input data, a dense layer 230, and a classification layer 240 to output a prediction that can be interpreted as probabilities of a current branch being taken or not taken. Training of the neural network 203 may be conducted "offline" on a sample run of the program 205 for hard to predict branches, such as H2P 257. In some embodiments, a separate network might be trained for each branch, or one network for all branches. In alternative embodiments, the trace program 250 can be divided into training and test sections. The training section is reserved for the network training, and test section is used for validating the performance of the trained network.

Input to the embedding layer 210 of neural network 203 is the branch history 205 for hard to predict branches. The history 205 is a vector of integers that represent the PCs of the prior branching instructions along with their outcomes. As discussed, each PC value in the program trace is given two unique integer values. The first one is for this PC when the branch is taken, and the second one is when the branch is not taken. For example, assume there are three branches in the trace. Each branch may have a PC value as follows: Branch 1 has a PC1 of 7000, Branch 2 has a PC2 of 8000, and Branch 3 has a PC3 of 9000. In the trace, wherever Branch1 is "taken", an integer id of 0 is recorded. If Branch1 is "not taken", an integer id of 1 is recorded. Similarly, if Branch2 is taken then "2" is recorded, otherwise if Branch2 is not taken "3" is recorded. Branch3 taken is 4, Branch3 not taken is 5. If the global history length N=4 and the sequence of branches is: T=0, Branch1,Not Taken 1, T=1, Branch2, Not Taken 3, T=2, Branch2, Not Taken 3, T=3, Branch2, Taken 2, T=4 where Branch3 is an H2P. In this example, if Branch 3 is to be predicted from this trace, a sequence of integer ids such as [1,3,3,2] is generated.

The length of the branch history is the maximum global history length (N) within which a user desires to capture correlations. The embedding layer converts the integer vector of branch history 205 into a matrix of real values with the shape (N by K) where K is the embedding dimension and is a user-defined parameter. In other words, the embedding layer converts each integer id to a unique real valued vector of length K. This conversion is performed with a set of weights learned in the embedding layer during network training.

The convolutional layer 220 may include a series of convolutional layers that learn patterns in the input data (e.g., branch history data 205). The convolutional layers consist of a set of learnable filters. These filters are the same as neurons as described above. The weights of these filters (neurons) are learned during network training.

In some embodiments, pooling layers (not shown) can be inserted in between convolutional layers. Its function is to progressively reduce the spatial size of the representation to reduce the amount of parameters and computation in the network.

The dense layer 230 (also referred to as a fully connected layer) may include a series of dense layers in which the depth of the dense layers and number of neurons are a user-defined parameter. Neurons in a fully connected layer have full connections to all activations in the previous layer. The fully connected layer takes all the neurons in the previous layer in the convolutional neural network and connects them to every neuron in the fully connected layer.

The classification layer 240 outputs a branch prediction 260 for a desired branch, such as for H2P 257. For example, a single output neuron weighs the outputs of the layer of neurons directly preceding it, and produces a prediction.

Once the neural network 203 is trained "online" using the branch history data 205, learned weights 207 from the neural network 203 are used to identify correlated branches (features). For example, learned filter weights in from convolutional layer 220 are compared with the learned embedding vectors of the embedding layer 210. This comparison is based on the distance of two vectors. For example, the embedding layer 210 determines (e.g., learns) a vector for each integer id. In the example, above, six vectors are learned (two for each of Branch1 . . . 3). Each convolutional filter also determines a weight vector. Number of these filters (e.g., vectors) is a user defined parameter. After training the neural network 203, the vector for the first convolutional filter is compared to each of the six vectors in the embedding layer 210. Although this comparison is based on the distance of two vectors, other techniques may be used. For example, the embedding vector that is closest to this convolutional filter may be used to identify the integer id it corresponds to. If this integer id corresponds to Branch1 being taken, Branch1 is labeled as a feature. This process is repeated for each convolutional filter until all identified features are recorded.

As noted above, each embedding uniquely corresponds to a branching PC in the trace 250. For a given filter weight, dot products of the weight and each PC embedding is computed. The PC embedding that has the maximum absolute dot product value with the filter weight is identified as a feature. This generally yields far fewer features than the total number of PCs in the trace 250. The identified features are used to build a feature vector, which is used during the "online" classification training as further discussed below.

Figure 3:
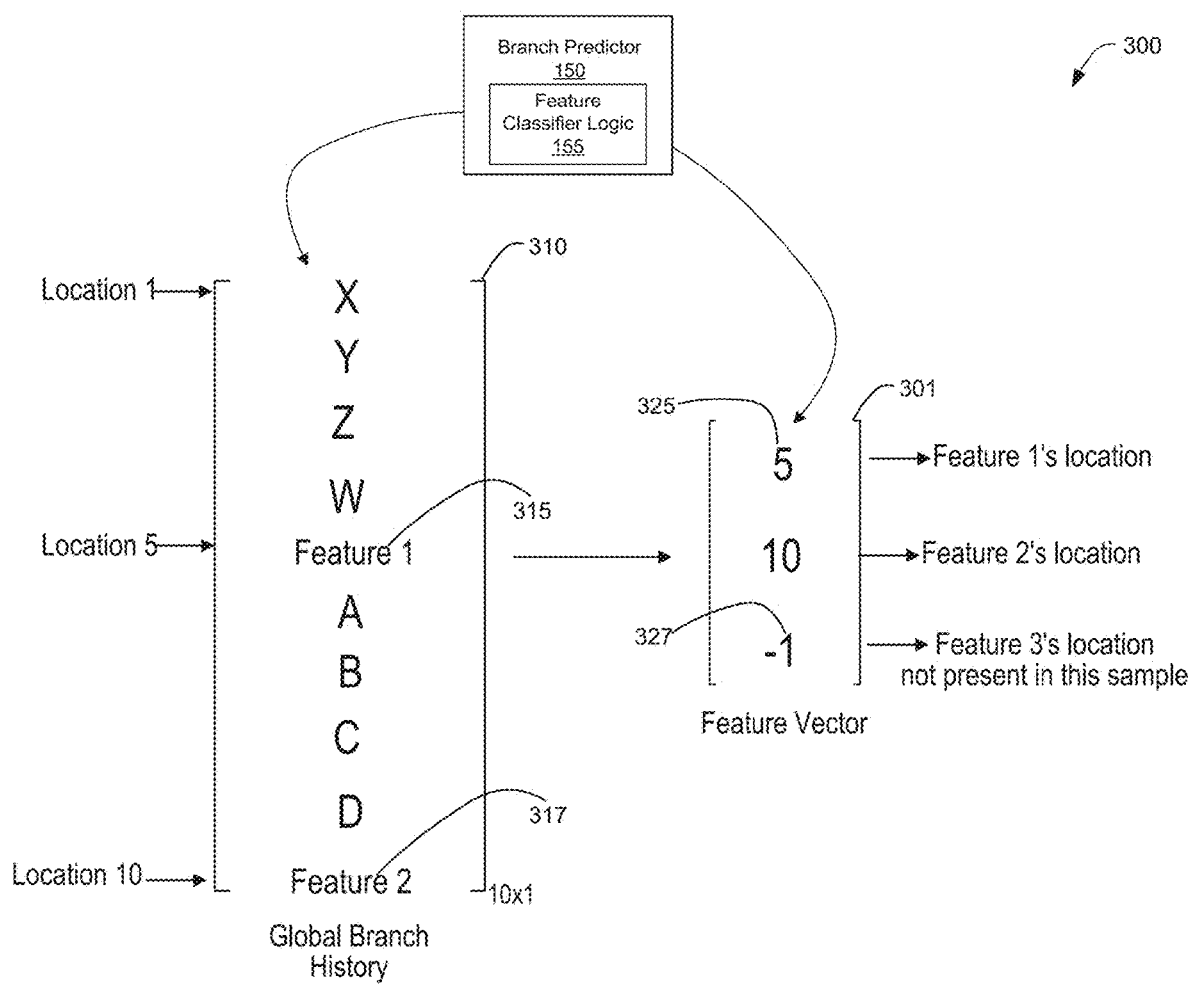
FIG. 3 illustrates an example system including a vector to support learned branch predictors according to one embodiment.

FIG. 3 illustrates an example system 300 including a feature vector 301 to support learned branch predictors according to one embodiment. The feature vector 301 can be vector of a certain length that comprises a plurality of data fields where each data field comprises location information for a corresponding feature, such as the locations ("5", "10", "4"), with respect to the branch history 310. In this regard, "−1" is used if a feature is not present in the history. All positive values record the location of this feature in the history. The feature vector 301 can be built in several ways. For example, a sequence of [1,3,3,2] may be built from that trace data where Branch1 may be identified as a feature while Branch2 is not. There are other branches that were identified as features, so in total 5 features are identified. If among the 5 features identified, only Branch1 is present in the history, and its location is at position zero. In that regard, a feature vector of length 5 may include: [0,−1,−1,−1,−1], where zero (0) indicates that Branch1 is at position zero in the history, and the other feature branches are not present in the history. If Branch1 had occurred twice in the history, the location of its latest occurrence could have been recorded in the feature vector. In another example, the feature vector records how many times a feature is present in the branch history. Then the resulting vector would be [1,0,0,0,0], where Branch1 occurred only once, and none of the other branches were detected. If Branch1 occurs twice, the feature vector may be represented as [2,0,0,0,0].

As noted above, the neural network 203 is then trained "offline" by branch predictor 150, using global branch history data (A-D and X-W) for particular branches executed during a trace of a program. Here, the global branch history 310 is a vector of integers that represent the PCs of the branching instructions preceding the H2P 250 along with their outcomes.

As shown in FIG. 3, the global branch history 310 vector's length (N) is 10, and three features are identified using the neural network 203. The global branch history 310 vector of length 10 includes the unique integer IDs of the branching PCs in the history. In this regard, location 1 is the earliest occurring branch PC, and location 10 is the least recently seen branch PC. Feature 1 is seen at location "5", and Feature 2 is seen at location "10". Feature 3 is not seen in this instance of the history so a location of "−1" is placed in the feature vector 301. Other PCs in the 10-long history are not identified as features.

In some embodiments, the length of the feature vector corresponds with the number of features selected from the global branch history 310. For example, the length of feature vector 301 is a 3-long vector with each integer field (e.g., field 325 and field 327) in the vector comprising a location. Each location in the integer field is set by the branch predictor 150 to correspond with a location of one of the identified features in the global branch history 310. For example, the location of feature 1 in the global branch history 310 is 5 while the location of feature 2 in the global branch history 310 is 10. For example, the features may be selected in order from earliest to latest in the branch history. If the feature is absent in this sample portion of the global branch history 310, the branch predictor 150 records a −1 in the feature vector 301. If a feature is in the global branch history 310 multiple times, the branch predictor 150 records the location of the most recent observation. In alternative embodiments, other techniques can be used to build feature vectors, such as putting (1) in a feature's location if this feature was seen in the branch history, and (−1) if the feature is absent in the history.

Figure 4:
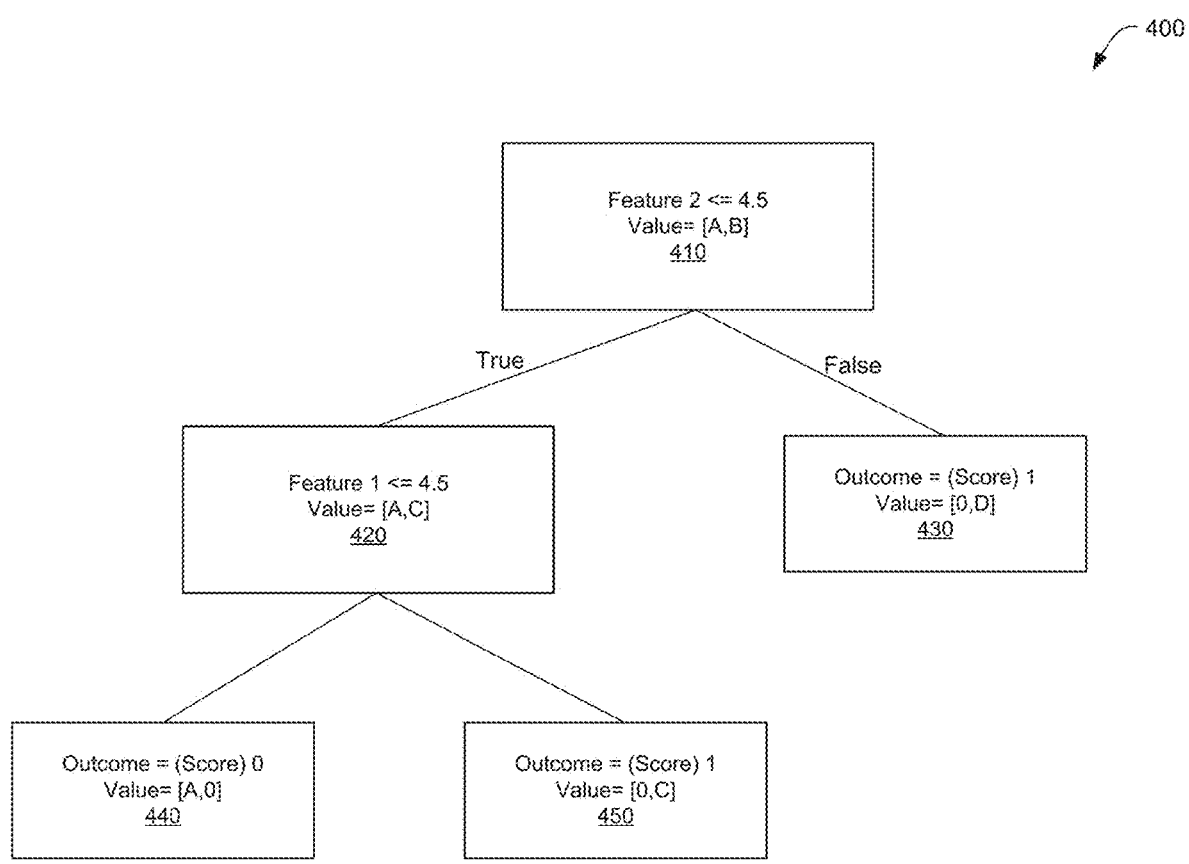
FIG. 4 illustrates an example data model to support learned branch predictors according to one embodiment.

FIG. 4 illustrates an example data model 400 to support learned branch predictors according to one embodiment. In this example, the branch predictor 150 uses feature vectors to train the data model 400 for branch prediction. In some embodiments, the data model 400 may be implemented as a decision tree by the branch predictor 150 by selecting features from the feature vector 301 of FIG. 3, although other types of data structures are possible. In one example, the branch predictor 150 may analyze instances of extracted features from the feature vector to determine parameters that split branch nodes of the decision tree. The resulting decision tree may be a flow chart like structure stored on a memory device (e.g., memory 201 of FIG. 2) that may be used to classify the portion of features. In some embodiments, the data model 400 is a classifier in the form of a tree structure that includes branch nodes and leaf nodes. Each branch node specifies a feature, such as feature 1 410 and feature 2 420 that includes a test to be carried out on the branch node. For example, each internal (or non-leaf) node denotes a test on an extracted feature and each branch represents an outcome of the test.

In the data model 400, at each branching node, the values of the feature vector are examined to determine if they satisfy a certain condition. In other words, a branch node in the tree indicates that there is a test in this node, and proceed according to the outcome of this test. If there are no more tests, the tree may arrive at a leaf node. Leaf nodes will not include test, but rather predict the outcome as taken or not taken. For example, assume the feature vector X=[0,−1,−1,−1,−1]. The first branching node in the decision tree may include a test, such as "Is the first element of vector X greater than or equal to zero?" If it is greater than or equal to zero, then outcome is predicted as "taken". This is a leaf node because there are no more tests and the outcome is directly predicted. If first element of X is smaller than zero, then the data model 400 may include another branching node that test if the second element of X is greater than 0. This test is called a branch node in the tree and may continue until no more tests are required.

The branch node at the root of the decision tree may be the earliest branch of the correlated branches in the branch history, such as feature 1 410. For example, the branch predictor 150 may select the first feature location from the feature vector 301 as a root branch node of the tree, which corresponds to feature (e.g., a correlated branch). The leaf nodes are possible outcome from the branch. Each left node, such as outcomes 430, 440, 450, represents an outcome of the corresponding branch. The leaf nodes can also contain additional information about the represented classification such as a confidence score that measures a confidence in the represented classification (e.g., the likelihood of the classification being accurate in the direction that the branch will be taken). For example, the confidence score can be a value ranging from 0 to 1, which a score of 0 indicates a very low confidence (e.g., the indication value of the represented classification is very low) and a score of 1 indicating a very high confidence (e.g., the represented classification is almost certainly accurate). As shown on FIG. 4, this decision tree needs to check only two features (Feature 1 410 and Feature 2 420) to decide the outcome of the branch.

In some embodiments, a processing device, such as processing device 100, can deploy the decision tree to predict branches of interest. For example, the data model 400 can be stored in memory associated with processing device 100 (either as part of an algorithm executed on the processing device or logic implemented on the die). This decision tree can assist the main branch predictor for a set of branches that are poorly predicted by traditional branch predictors.

Figure 5:
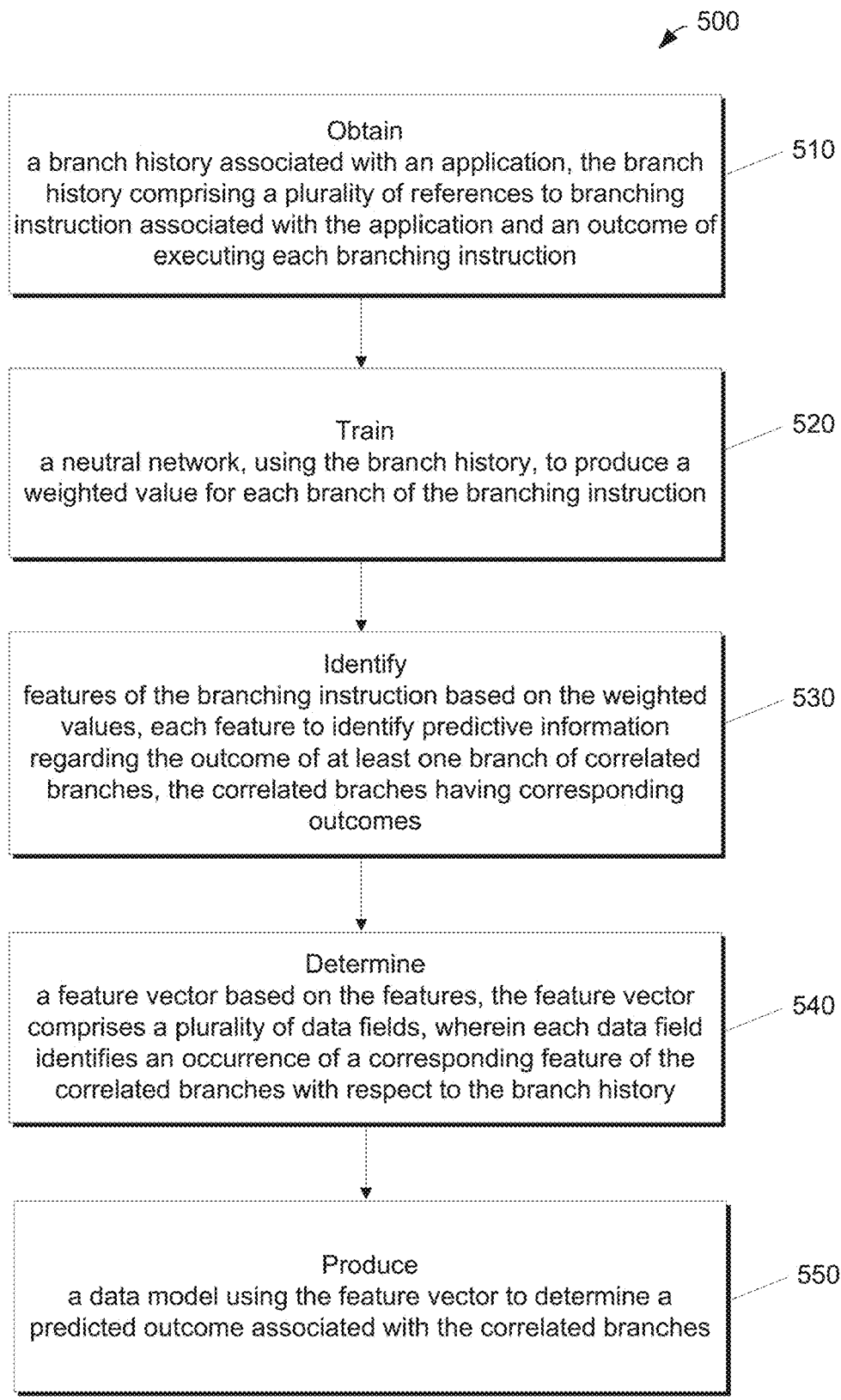
FIG. 5 illustrates a flow diagram of a method for supporting learned branch predictors according to one embodiment.

FIG. 5 illustrates a flow diagram of a method 500 for supporting learned branch predictors according to one embodiment. Method 500 is performed by, for example, processing logic (such as the feature classifier logic 155 of FIG.) comprising hardware (e.g., circuitry, dedicated logic, programmable logic, microcode, etc.), software (such as instructions run on a processing device), firmware, or a combination thereof. In one embodiment, an interrupt managing circuit (e.g., branch predictor 150) of the processing device 100 in FIG. 1 may perform method 500. Although shown in a particular sequence or order, unless otherwise specified, the order of the processes can be modified. Thus, the illustrated embodiments should be understood only as examples, and the illustrated processes can be performed in a different order, and some processes may be performed in parallel. Additionally, one or more processes can be omitted in various embodiments. Thus, not all processes are required in every embodiment. Other process flows are possible.

Referring to FIG. 5, method 500 receives, in block 510, a branch history 205 associated with an application 250. The branch history 205 comprises a plurality of references to branching instruction 251-256 associated with the application 250 and an outcome 430-450 of executing each branching instruction. In block 520, a neural network 203 is trained, using the branch history 205, to produce a weighted value 207 for each branch of the branching instructions 251-256. In block 530, features 315-317 of the branching instructions 251-256 are identified based on the weighted values. For example, if the weighted value for a particular branch meets a certain threshold, the particular branch is considered a feature. Each feature 315-317 identifies predictive information regarding the outcome of at least one branch of correlated branches (410,420). These correlated braches have corresponding outcomes that is braches with outcomes having a tendency to move in tandem with each other either in the same direction or opposite directions.

In block 540, a feature vector 320 is determined based on the features 315-317. The feature vector 320 comprises a plurality of data fields where each data field identifies an occurrence of a corresponding feature of the correlated branches (410,420) in the branch history 205. Each data field of the feature vector 320 may, for example, reference a location of the occurrence of the corresponding feature in the branch history, identify a number of times the occurrence of the corresponding feature is in the branch history, identify whether the corresponding feature is in or absent from the branch history as well as other types of data fields may be used to build vector 320. Using the feature vector 320, a data model 400 is produced in block 550 to determine a predicted outcome 430-450 associated with the correlated branches (410,420).

Figure 6A:
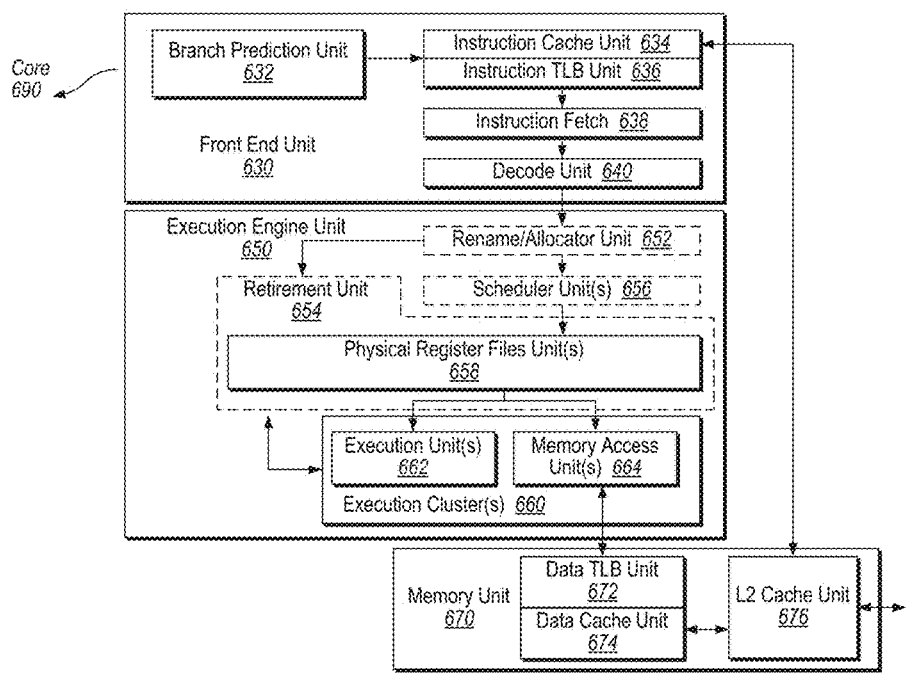
FIG. 6A is a block diagram illustrating a micro-architecture for a processor according to an embodiment of the disclosure.

FIG. 6A is a block diagram illustrating a micro-architecture for a processor 600 that implements techniques for supporting learned branch predictors in accordance with one embodiment of the disclosure. Specifically, processor 600 depicts an in-order architecture core and a register renaming logic, out-of-order issue/execution logic to be included in a processor according to at least one embodiment of the disclosure.

Processor 600 includes a front-end unit 630 coupled to an execution engine unit 650, and both are coupled to a memory unit 670. The processor 600 may include a reduced instruction set computing (RISC) core, a complex instruction set computing (CISC) core, a very long instruction word (VLIW) core, or a hybrid or alternative core type. As yet another option, processor 600 may include a special-purpose core, such as, for example, a network or communication core, compression engine, graphics core, or the like. In one embodiment, processor 600 may be a multi-core processor or may part of a multi-processor system.

The front end unit 630 includes a branch prediction unit 632 coupled to an instruction cache unit 634, which is coupled to an instruction translation lookaside buffer (TLB) 636, which is coupled to an instruction fetch unit 638, which is coupled to a decode unit 640. The decode unit 640 (also known as a decoder) may decode instructions, and generate as an output one or more micro-operations, micro-code entry points, microinstructions, other instructions, or other control signals, which are decoded from, or which otherwise reflect, or are derived from, the original instructions. The decoder 640 may be implemented using various different mechanisms. Examples of suitable mechanisms include, but are not limited to, look-up tables, hardware embodiments, programmable logic arrays (PLAs), microcode read only memories (ROMs), etc. The instruction cache unit 634 is further coupled to the memory unit 670. The decode unit 640 is coupled to a rename/allocator unit 652 in the execution engine unit 650.

The execution engine unit 650 includes the rename/allocator unit 652 coupled to a retirement unit 654 and a set of one or more scheduler unit(s) 656. The scheduler unit(s) 656 represents any number of different schedulers, including reservations stations (RS), central instruction window, etc. The scheduler unit(s) 656 is coupled to the physical register file(s) unit(s) 658. Each of the physical register file(s) units 658 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 658 is overlapped by the retirement unit 654 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.). The execution engine unit 650 may include for example a power management unit (PMU) 690 that governs power functions of the functional units.

Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 654 and the physical register file(s) unit(s) 658 are coupled to the execution cluster(s) 660. The execution cluster(s) 660 includes a set of one or more execution units 662 and a set of one or more memory access units 664. The execution units 662 may perform various operations (e.g., shifts, addition, subtraction, multiplication) and operate on various types of data (e.g., scalar floating point, packed integer, packed floating point, vector integer, vector floating point).

While some embodiments may include a number of execution units dedicated to specific functions or sets of functions, other embodiments may include only one execution unit or multiple execution units that all perform all functions. The scheduler unit(s) 656, physical register file(s) unit(s) 658, and execution cluster(s) 660 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 664). It should also be understood that where separate pipelines are used, one or more of these pipelines may be out-of-order issue/execution and the rest in-order.

The set of memory access units 664 is coupled to the memory unit 670, which may include a data prefetcher 680, a data TLB unit 672, a data cache unit (DCU) 674, and a level 2 (L2) cache unit 676, to name a few examples. In some embodiments DCU 674 is also known as a first level data cache (L1 cache). The DCU 674 may handle multiple outstanding cache misses and continue to service incoming stores and loads. It also supports maintaining cache coherency. The data TLB unit 672 is a cache used to improve virtual address translation speed by mapping virtual and physical address spaces. In one exemplary embodiment, the memory access units 664 may include a load unit, a store address unit, and a store data unit, each of which is coupled to the data TLB unit 672 in the memory unit 670. The L2 cache unit 676 may be coupled to one or more other levels of cache and eventually to a main memory.

In one embodiment, the data prefetcher 680 speculatively loads/prefetches data to the DCU 674 by automatically predicting which data a program is about to consume. Prefeteching may refer to transferring data stored in one memory location of a memory hierarchy (e.g., lower level caches or memory) to a higher-level memory location that is closer (e.g., yields lower access latency) to the processor before the data is actually demanded by the processor. More specifically, prefetching may refer to the early retrieval of data from one of the lower level caches/memory to a data cache and/or prefetch buffer before the processor issues a demand for the specific data being returned.

In one embodiment, processor 600 may be the same as processing device 100 described with respect to FIG. 1 supporting learned branch predictors as described with respect to embodiments of the disclosure.

The processor 600 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.).

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming is used in the in-order architecture. While the illustrated embodiment of the processor also includes a separate instruction and data cache units and a shared L2 cache unit, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 6B:
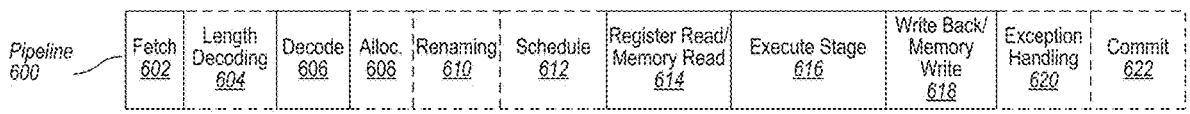
FIG. 6B is a block diagram illustrating an in-order pipeline and a register renaming stage, out-of-order issue/execution pipeline according to an embodiment of the disclosure.

FIG. 6B is a block diagram illustrating an in-order pipeline and a register renaming stage, out-of-order issue/execution pipeline implemented by processor 600 of FIG. 6A according to some embodiments of the disclosure. The solid lined boxes in FIG. 6B illustrate an in-order pipeline, while the dashed lined boxes illustrates a register renaming, out-of-order issue/execution pipeline. In FIG. 6B, a processor pipeline 601 includes a fetch stage 602, a length decode stage 604, a decode stage 606, an allocation stage 608, a renaming stage 610, a scheduling (also known as a dispatch or issue) stage 612, a register read/memory read stage 614, an execute stage 616, a write back/memory write stage 618, an exception handling stage 622, and a commit stage 624. In some embodiments, the ordering of stages 602-624 may be different than illustrated and are not limited to the specific ordering shown in FIG. 6B.

Figure 7:
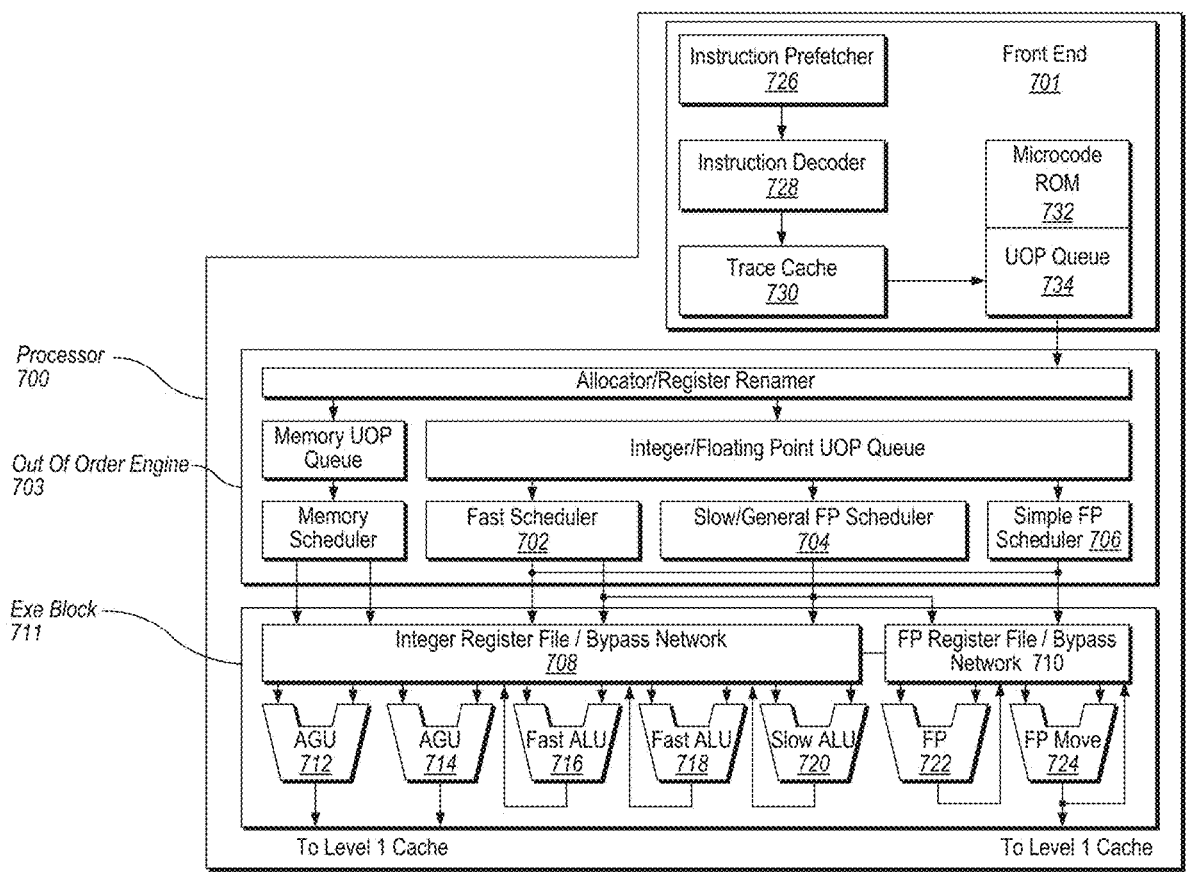
FIG. 7 is a block diagram illustrating a micro-architecture for a processor in accordance with one embodiment of the disclosure.

FIG. 7 illustrates a block diagram of the micro-architecture for a processor 700 that includes logic circuits to implement techniques for supporting learned branch predictors in accordance with one embodiment of the disclosure. In some embodiments, an instruction in accordance with one embodiment can be implemented to operate on data elements having sizes of byte, word, doubleword, quadword, etc., as well as data types, such as single and double precision integer and floating point data types. In one embodiment the in-order front end 701 is the part of the processor 700 that fetches instructions to be executed and prepares them to be used later in the processor pipeline.

The front end 701 may include several units. In one embodiment, the instruction prefetcher 726 fetches instructions from memory and feeds them to an instruction decoder 728, which in turn decodes or interprets them. For example, in one embodiment, the decoder decodes a received instruction into one or more operations called "micro-instructions" or "micro-operations" (also called micro op or uops) that the machine can execute. In other embodiments, the decoder parses the instruction into an opcode and corresponding data and control fields that are used by the micro-architecture to perform operations in accordance with one embodiment. In one embodiment, the trace cache 730 takes decoded uops and assembles them into program ordered sequences or traces in the uop queue 734 for execution. When the trace cache 730 encounters a complex instruction, the microcode ROM 732 provides the uops needed to complete the operation.

Some instructions are converted into a single micro-op, whereas others need several micro-ops to complete the full operation. In one embodiment, if more than four micro-ops are needed to complete an instruction, the decoder 728 accesses the microcode ROM 732 to do the instruction. For one embodiment, an instruction can be decoded into a small number of micro ops for processing at the instruction decoder 728. In another embodiment, an instruction can be stored within the microcode ROM 732 should a number of micro-ops be needed to accomplish the operation. The trace cache 730 refers to an entry point programmable logic array (PLA) to determine a correct microinstruction pointer for reading the micro-code sequences to complete one or more instructions in accordance with one embodiment from the micro-code ROM 732. After the microcode ROM 732 finishes sequencing micro-ops for an instruction, the front end 701 of the machine resumes fetching micro-ops from the trace cache 730.

The out-of-order execution engine 703 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 702, slow/general floating point scheduler 704, and simple floating point scheduler 706. The uop schedulers 702, 704, 706, determine when a uop is ready to execute based on the readiness of their dependent input register operand sources and the availability of the execution resources the uops need to complete their operation. The fast scheduler 702 of one embodiment can schedule on each half of the main clock cycle while the other schedulers can only schedule once per main processor clock cycle. The schedulers arbitrate for the dispatch ports to schedule uops for execution.

Register files 708, 710 sit between the schedulers 702, 704, 706, and the execution units 712, 714, 716, 718, 720, 722, 724 in the execution block 711. There is a separate register file 708, 710, for integer and floating-point operations, respectively. Each register file 708, 710, of one embodiment also includes a bypass network that can bypass or forward just completed results that have not yet been written into the register file to new dependent uops. The integer register file 708 and the floating-point register file 710 are also capable of communicating data with the other. For one embodiment, the integer register file 708 is split into two separate register files, one register file for the low order 32 bits of data and a second register file for the high order 32 bits of data. The floating-point register file 710 of one embodiment has 128 bit wide entries because floating-point instructions typically have operands from 64 to 128 bits in width.

The execution block 711 contains the execution units 712, 714, 716, 718, 720, 722, 724, where the instructions are actually executed. This section includes the register files 708, 710 that store the integer and floating point data operand values that the microinstructions need to execute. The processor 700 of one embodiment is comprised of a number of execution units: address generation unit (AGU) 712, AGU 714, fast ALU 716, fast ALU 718, slow ALU 720, floating point ALU 722, floating point move unit 724. For one embodiment, the floating-point execution blocks 722, 724, execute floating point, MMX, SIMD, and SSE, or other operations. The floating point ALU 722 of one embodiment includes a 64 bit by 64 bit floating point divider to execute divide, square root, and remainder micro-ops. For embodiments of the disclosure, instructions involving a floating-point value may be handled with the floating-point hardware.

In one embodiment, the ALU operations go to the high-speed ALU execution units 716, 718. The fast ALUs 716, 718, of one embodiment can execute fast operations with an effective latency of half a clock cycle. For one embodiment, most complex integer operations go to the slow ALU 720 as the slow ALU 720 includes integer execution hardware for long latency type of operations, such as a multiplier, shifts, flag logic, and branch processing. The AGUs 712, 714 may execute memory load/store operations. For one embodiment, the integer ALUs 716, 718, 720, are described in the context of performing integer operations on 64 bit data operands. In alternative embodiments, the ALUs 716, 718, 720, can be implemented to support a variety of data bits including 16, 32, 128, 256, etc. Similarly, the floating-point units 722, 724, can be implemented to support a range of operands having bits of various widths. For one embodiment, the floating-point units 722, 724, can operate on 128 bits wide packed data operands in conjunction with SIMD and multimedia instructions.

In one embodiment, the uops schedulers 702, 704, 706, dispatch dependent operations before the parent load has finished executing. As uops are speculatively scheduled and executed in processor 700, the processor 700 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one embodiment of a processor are also designed to catch instruction sequences for text string comparison operations.

The processor 700 also includes logic to implement store address prediction for memory disambiguation according to embodiments of the disclosure. In one embodiment, the execution block 711 of processor 700 may include a store address predictor (not shown) for implementing techniques for supporting learned branch predictors in accordance with one embodiment of the disclosure.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data. In one embodiment, a register file also includes eight (8) multimedia SIMD register(s) for the packed data.

For the discussions below, the registers are understood to be data registers designed to hold packed data, such as 64 bits wide MMX™ registers (also referred to as 'mm' registers in some instances) in microprocessors enabled with MMX technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

Figure 8:
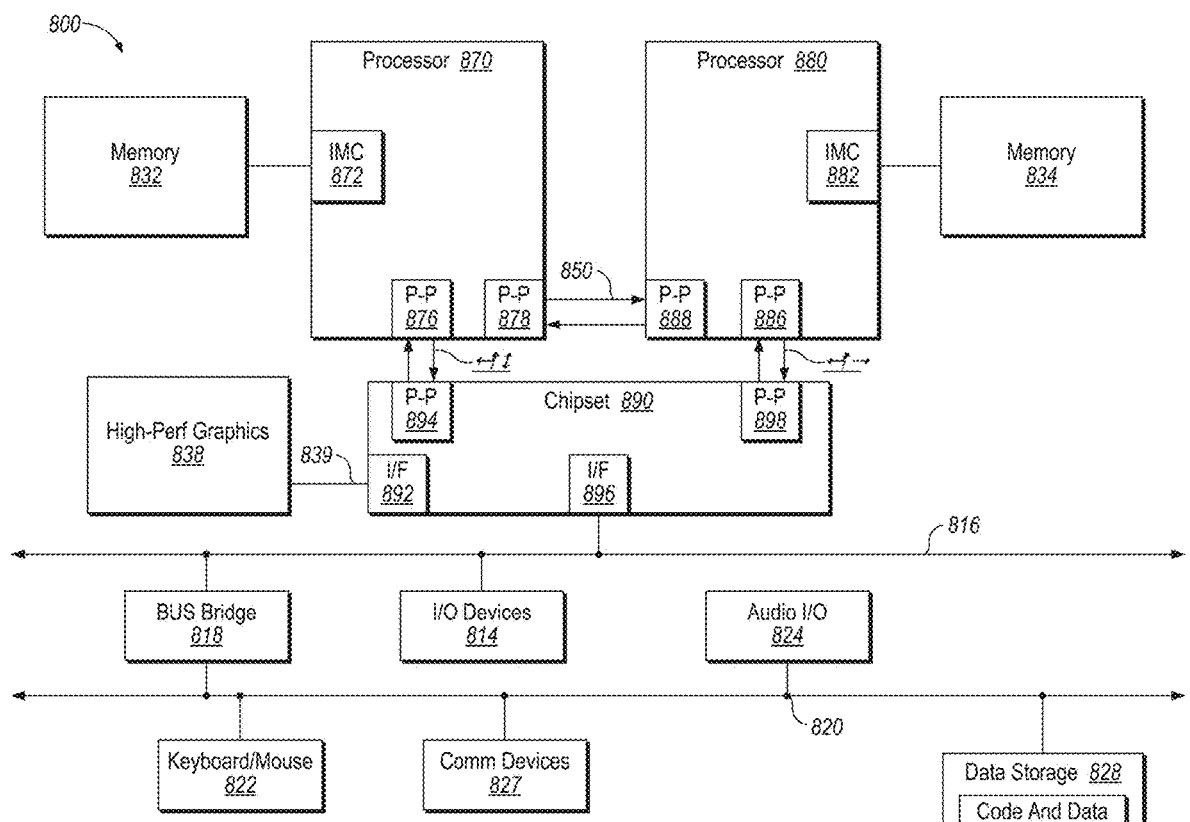
FIG. 8 is a block diagram illustrating a system in which an embodiment of the disclosure may be used.

Embodiments may be implemented in many different system types. Referring now to FIG. 8, shown is a block diagram illustrating a system 800 in which an embodiment of the disclosure may be used. As shown in FIG. 8, multiprocessor system 800 is a point-to-point interconnect system, and includes a first processor 870 and a second processor 880 coupled via a point-to-point interconnect 850. While shown with only two processors 870, 880, it is to be understood that the scope of embodiments of the disclosure is not so limited. In other embodiments, one or more additional processors may be present in a given processor. In one embodiment, the multiprocessor system 800 may implement techniques for supporting learned branch predictors as described herein.

Processors 870 and 880 are shown including integrated memory controller units 872 and 882, respectively. Processor 870 also includes as part of its bus controller units point-to-point (P-P) interfaces 876 and 878; similarly, second processor 880 includes P-P interfaces 886 and 888. Processors 870, 880 may exchange information via a point-to-point (P-P) interface 850 using P-P interface circuits 878, 888. As shown in FIG. 8, IMCs 872 and 882 couple the processors to respective memories, namely a memory 832 and a memory 834, which may be portions of main memory locally attached to the respective processors.

Processors 870, 880 may exchange information with a chipset 890 via individual P-P interfaces 852, 854 using point-to-point interface circuits 876, 894, 886, 898. Chipset 890 may also exchange information with a high-performance graphics circuit 838 via a high-performance graphics interface 839.

A shared cache (not shown) may be included in either processor or outside of both processors, yet connected with the processors via P-P interconnect, such that either or both processors' local cache information may be stored in the shared cache if a processor is placed into a low power mode.

Chipset 890 may be coupled to a first bus 816 via an interface 896. In one embodiment, first bus 816 may be a Peripheral Component Interconnect (PCI) bus, or a bus such as a PCI Express bus or another third generation I/O interconnect bus, although the scope of the disclosure is not so limited.

As shown in FIG. 8, various I/O devices 814 may be coupled to first bus 816, along with a bus bridge 818, which couples first bus 816 to a second bus 820. In one embodiment, second bus 820 may be a low pin count (LPC) bus. Various devices may be coupled to second bus 820 including, for example, a keyboard and/or mouse 822, communication devices 827 and a storage unit 828 such as a disk drive or other mass storage device, which may include instructions/code and data 830, in one embodiment. Further, an audio I/O 824 may be coupled to second bus 820. Note that other architectures are possible. For example, instead of the point-to-point architecture of FIG. 8, a system may implement a multi-drop bus or other such architecture.

Figure 9:
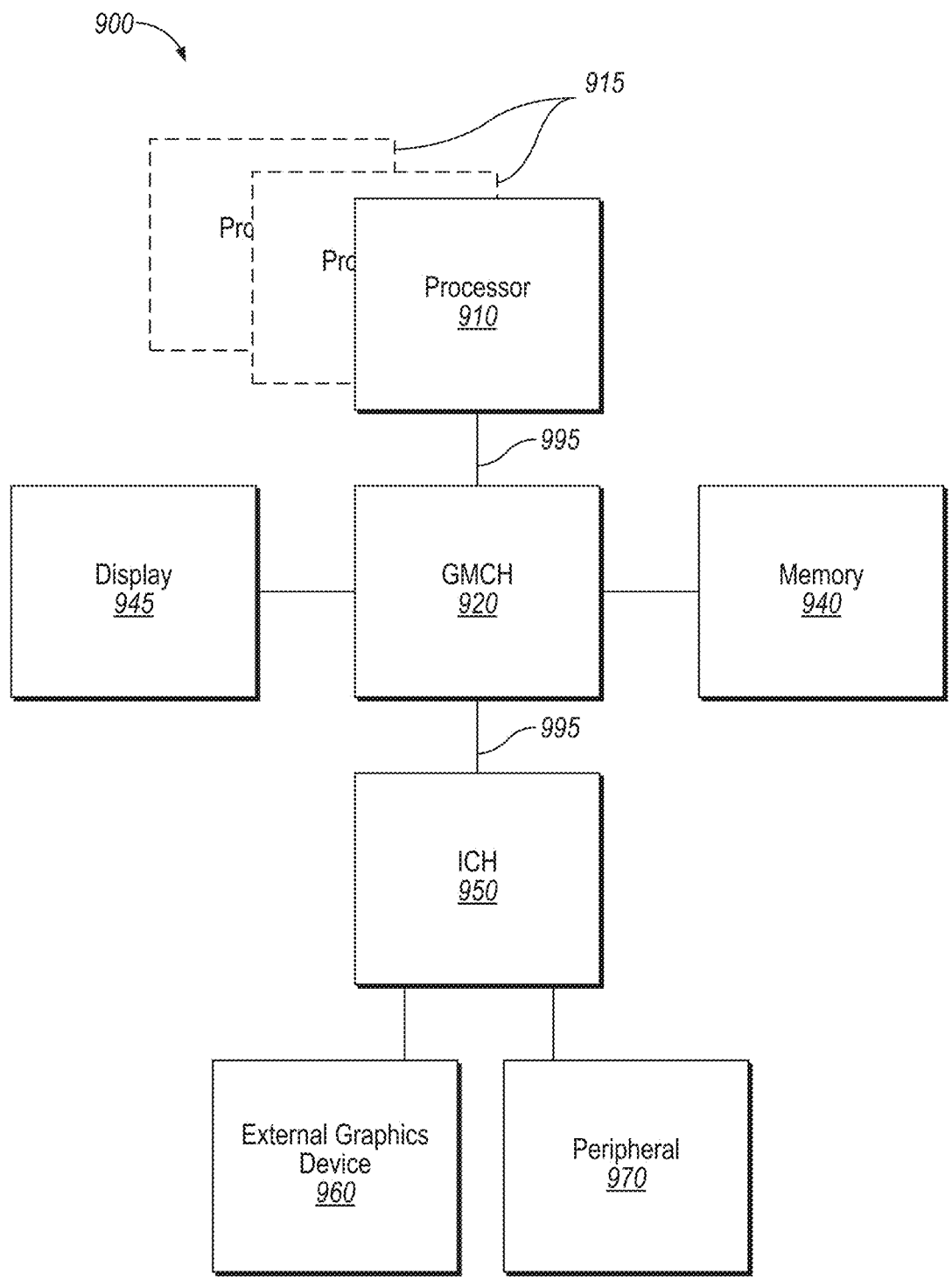
FIG. 9 is a block diagram illustrating a system in which an embodiment of the disclosure may operate.

Referring now to FIG. 9, shown is a block diagram of a system 900 in which one embodiment of the disclosure may operate. The system 900 may include one or more processors 910, 915, which are coupled to graphics memory controller hub (GMCH) 920. The optional nature of additional processors 915 is denoted in FIG. 9 with broken lines. In one embodiment, processors 910, 915 provide for supporting learned branch predictors according to embodiments of the disclosure.

Each processor 910, 915 may be some version of the circuit, integrated circuit, processor, and/or silicon integrated circuit as described above. However, it should be noted that it is unlikely that integrated graphics logic and integrated memory control units would exist in the processors 910, 915. FIG. 9 illustrates that the GMCH 920 may be coupled to a memory 940 that may be, for example, a dynamic random access memory (DRAM). The DRAM may, for at least one embodiment, be associated with a non-volatile cache.

The GMCH 920 may be a chipset, or a portion of a chipset. The GMCH 920 may communicate with the processor(s) 910, 915 and control interaction between the processor(s) 910, 915 and memory 940. The GMCH 920 may also act as an accelerated bus interface between the processor(s) 910, 915 and other elements of the system 900. For at least one embodiment, the GMCH 920 communicates with the processor(s) 910, 915 via a multi-drop bus, such as a front side bus (FSB) 995.

Furthermore, GMCH 920 is coupled to a display 945 (such as a flat panel or touchscreen display). GMCH 920 may include an integrated graphics accelerator. GMCH 920 is further coupled to an input/output (I/O) controller hub (ICH) 950, which may be used to couple various peripheral devices to system 900. Shown for example in the embodiment of FIG. 9 is an external graphics device 960, which may be a discrete graphics device, coupled to ICH 950, along with another peripheral device 970.

Alternatively, additional or different processors may also be present in the system 900. For example, additional processor(s) 915 may include additional processors(s) that are the same as processor 910, additional processor(s) that are heterogeneous or asymmetric to processor 910, accelerators (such as, e.g., graphics accelerators or digital signal processing (DSP) units), field programmable gate arrays, or any other processor. There can be a variety of differences between the processor(s) 910, 915 in terms of a spectrum of metrics of merit including architectural, micro-architectural, thermal, power consumption characteristics, and the like. These differences may effectively manifest themselves as asymmetry and heterogeneity amongst the processors 910, 915. For at least one embodiment, the various processors 910, 915 may reside in the same die package.

Figure 10:
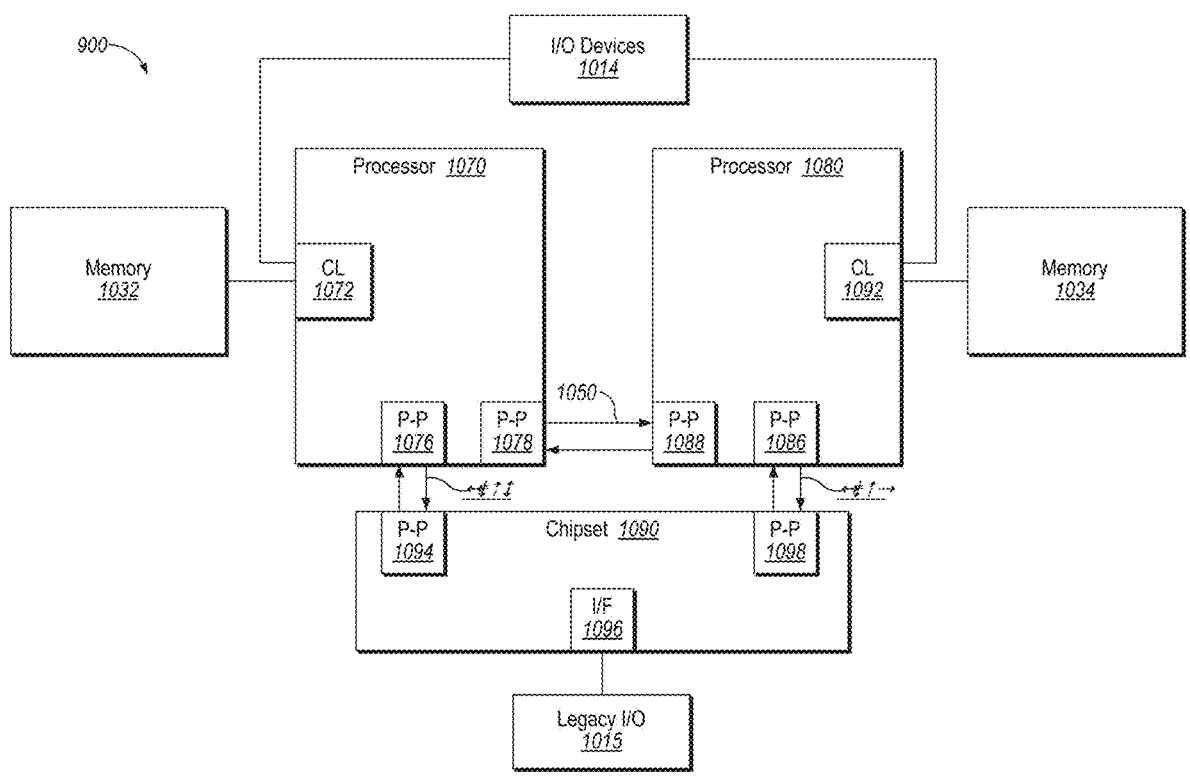
FIG. 10 is a block diagram illustrating a system in which an embodiment of the disclosure may operate.

Referring now to FIG. 10, shown is a block diagram of a system 1000 in which an embodiment of the disclosure may operate. FIG. 10 illustrates processors 1070, 1080. In one embodiment, processors 1070, 1080 may provide for supporting learned branch predictors as described above. Processors 1070, 1080 may include integrated memory and I/O control logic ("CL") 1072 and 1082, respectively and intercommunicate with each other via point-to-point interconnect 1050 between point-to-point (P-P) interfaces 1078 and 1088 respectively. Processors 1070, 1080 each communicate with chipset 1090 via point-to-point interconnects 1052 and 1054 through the respective P-P interfaces 1076 to 1094 and 1086 to 1098 as shown. For at least one embodiment, the CL 1072, 1082 may include integrated memory controller units. CLs 1072, 1082 may include I/O control logic. As depicted, memories 1032, 1034 coupled to CLs 1072, 1082 and I/O devices 1014 are also coupled to the control logic 1072, 1082. Legacy I/O devices 1015 are coupled to the chipset 1090 via interface 1096. The embodiments of the processing device 100 of FIG. 1 may be implemented in processor 1070, processor 1080, or both.

Figure 11:
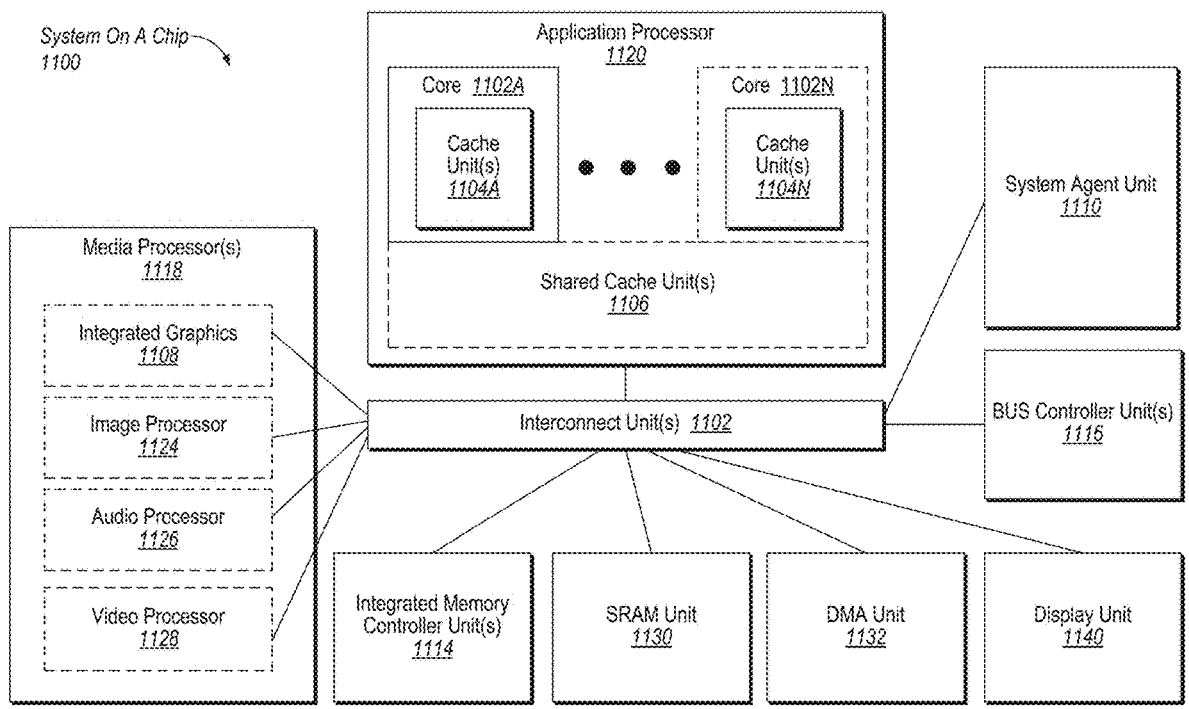
FIG. 11 is a block diagram illustrating a System-on-a-Chip (SoC) according to an embodiment of the disclosure.

Embodiments may be implemented in many different system types. FIG. 11 is a block diagram of a SoC 1100 in accordance with an embodiment of the disclosure. Dashed lined boxes are optional features on more advanced SoCs. In FIG. 11, an interconnect unit(s) 1112 is coupled to: an application processor 1120 which includes a set of one or more cores 1102A-N and shared cache unit(s) 1106; a system agent unit 1110; a bus controller unit(s) 1116; an integrated memory controller unit(s) 1114; a set of one or more media processors 1118 which may include integrated graphics logic 1108, an image processor 1124 for providing still and/or video camera functionality, an audio processor 1126 for providing hardware audio acceleration, and a video processor 1128 for providing video encode/decode acceleration; an static random access memory (SRAM) unit 1130; a direct memory access (DMA) unit 1132; and a display unit 1140 for coupling to one or more external displays. In one embodiment, a memory module may be included in the integrated memory controller unit(s) 1114. In another embodiment, the memory module may be included in one or more other components of the SoC 1100 that may be used to access and/or control a memory. The application processor 1120 may include a PMU for implementing silent memory instructions and miss-rate tracking to optimize switching policy on threads as described in embodiments herein.

The memory hierarchy includes one or more levels of cache within the cores, a set or one or more shared cache units 1106, and external memory (not shown) coupled to the set of integrated memory controller units 1114. The set of shared cache units 1106 may include one or more mid-level caches, such as level 2 (L2), level 3 (L3), level 4 (L4), or other levels of cache, a last level cache (LLC), and/or combinations thereof.

In some embodiments, one or more of the cores 1102A-N are capable of multi-threading. The system agent 1110 includes those components coordinating and operating cores 1102A-N. The system agent unit 1110 may include for example a power control unit (PCU) and a display unit. The PCU may be or include logic and components needed for regulating the power state of the cores 1102A-N and the integrated graphics logic 1108. The display unit is for driving one or more externally connected displays.

The cores 1102A-N may be homogenous or heterogeneous in terms of architecture and/or instruction set. For example, some of the cores 1102A-N may be in order while others are out-of-order. As another example, two or more of the cores 1102A-N may be capable of execution the same instruction set, while others may be capable of executing only a subset of that instruction set or a different instruction set.

The application processor 1120 may be a general-purpose processor, such as a Core™ i3, i5, i7, 2 Duo and Quad, Xeon™, Itanium™, Atom™ or Quark™ processor, which are available from Intel™ Corporation, of Santa Clara, Calif. Alternatively, the application processor 1120 may be from another company, such as ARM Holdings™, Ltd, MIPS™, etc. The application processor 1120 may be a special-purpose processor, such as, for example, a network or communication processor, compression engine, graphics processor, co-processor, embedded processor, or the like. The application processor 1120 may be implemented on one or more chips. The application processor 1120 may be a part of and/or may be implemented on one or more substrates using any of a number of process technologies, such as, for example, BiCMOS, CMOS, or NMOS.

Figure 12:
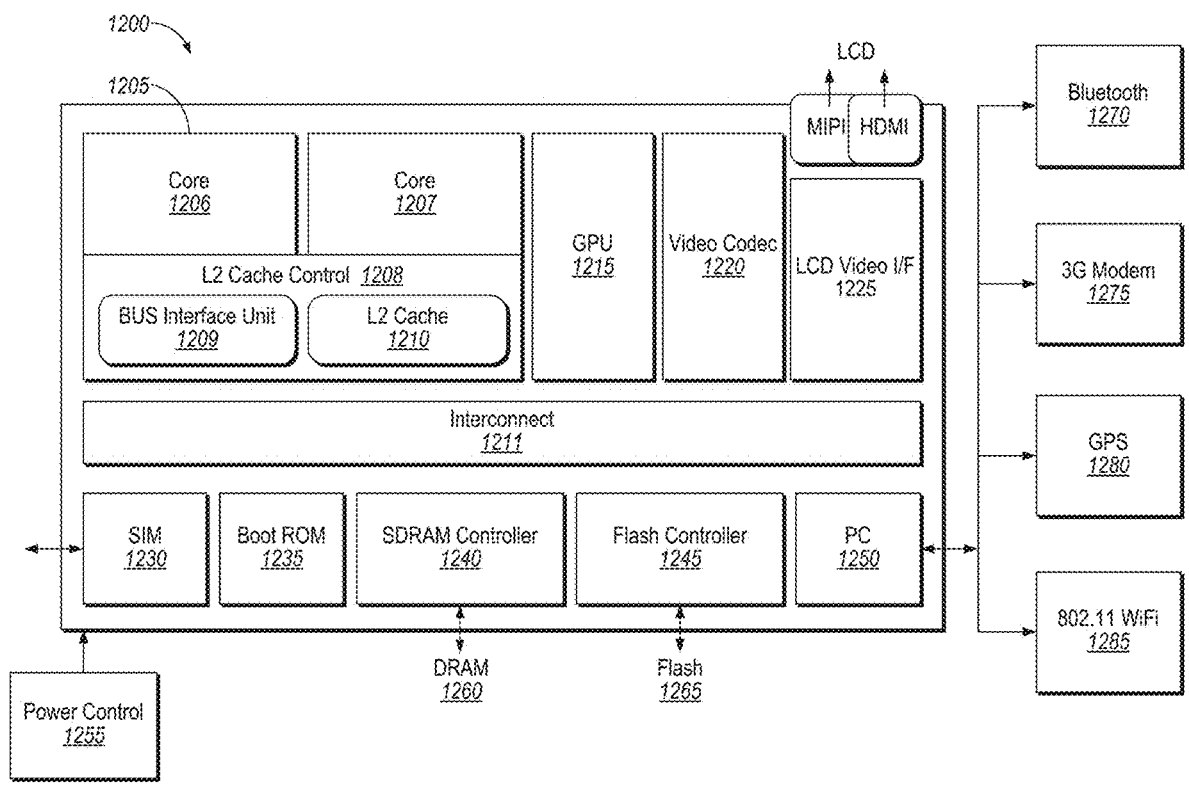
FIG. 12 is a block diagram illustrating a SoC design according to an embodiment of the disclosure.

FIG. 12 is a block diagram of an embodiment of a system on-chip (SoC) design in accordance with the disclosure. As a specific illustrative example, SoC 1200 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SOC 1200 includes 2 cores—1206 and 1207. Cores 1206 and 1207 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 1206 and 1207 are coupled to cache control 1208 that is associated with bus interface unit 1209 and L2 cache 1210 to communicate with other parts of system 1200. Interconnect 1210 includes an on-chip interconnect, such as an IOSF, AMBA, or other interconnect discussed above, which potentially implements one or more aspects of the described disclosure. In one embodiment, cores 1206, 1207 may provide for supporting learned branch predictors as described in embodiments herein.

Interconnect 1210 provides communication channels to the other components, such as a Subscriber Identity Module (SIM) 1230 to interface with a SIM card, a boot ROM 1235 to hold boot code for execution by cores 1206 and 1207 to initialize and boot SoC 1200, a SDRAM controller 1240 to interface with external memory (e.g. DRAM 1260), a flash controller 1247 to interface with non-volatile memory (e.g. Flash 1265), a peripheral control 1250 (e.g. Serial Peripheral Interface) to interface with peripherals, video codecs 1220 and Video interface 1225 to display and receive input (e.g. touch enabled input), GPU 1215 to perform graphics related computations, etc. Any of these interfaces may incorporate aspects of the disclosure described herein. In addition, the system 1200 illustrates peripherals for communication, such as a Bluetooth module 1270, 3G modem 1275, GPS 1280, and Wi-Fi 1185.

Figure 13:
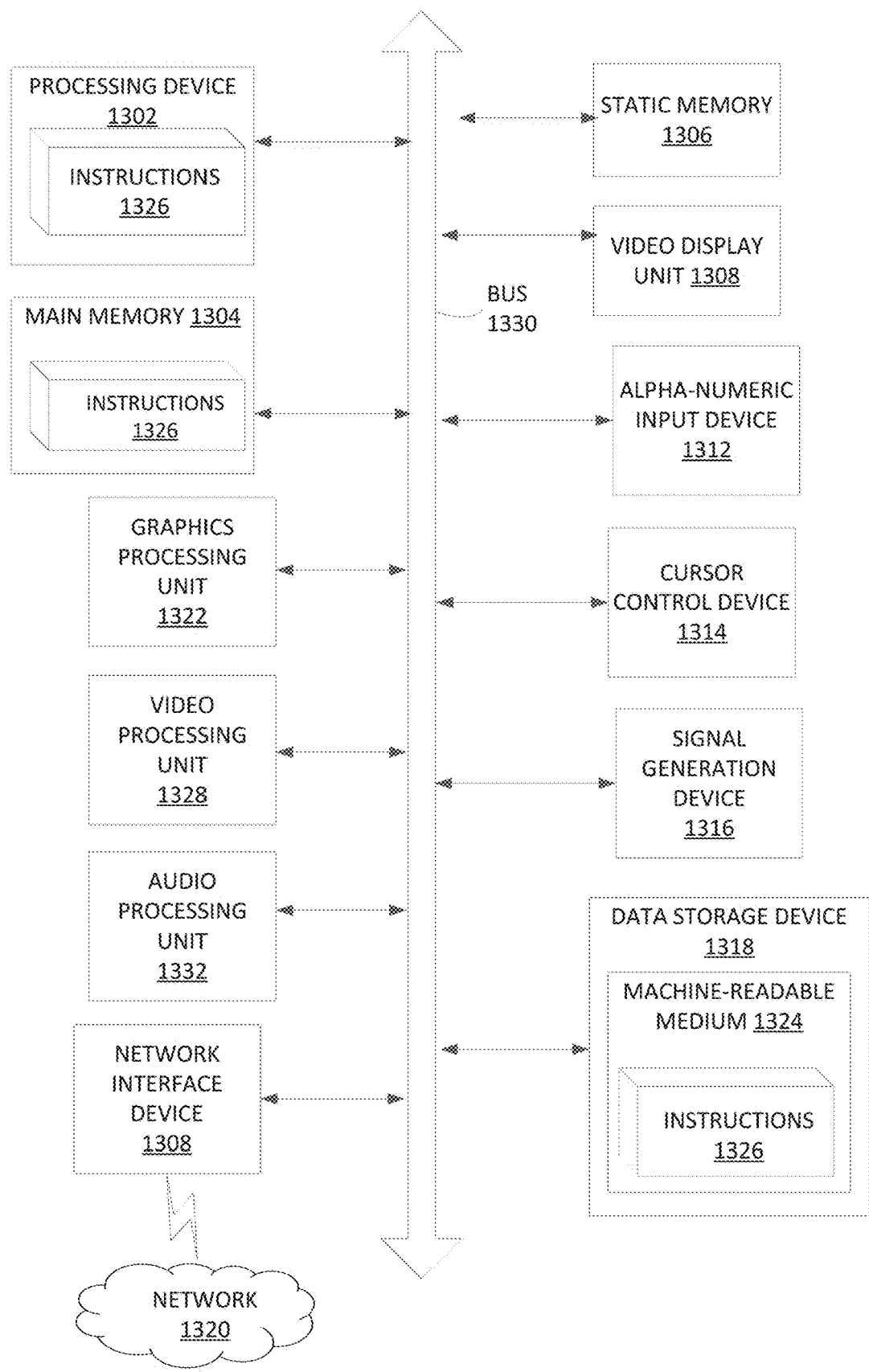
FIG. 13 illustrates a block diagram illustrating a computer system according to an embodiment of the disclosure.

FIG. 13 illustrates a diagrammatic representation of a machine in the example form of a computer system 1200 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 1300 includes a processing device 1302, a main memory 1304 (e.g., read-only memory (ROM), flash memory, dynamic random access memory (DRAM) (such as synchronous DRAM (SDRAM) or DRAM (RDRAM), etc.), a static memory 1306 (e.g., flash memory, static random access memory (SRAM), etc.), and a data storage device 1318, which communicate with each other via a bus 1330.

Processing device 1302 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1302 may also be one or more special-purpose processing devices such as an application specific integrated circuit (ASIC), a field programmable gate array (FPGA), a digital signal processor (DSP), network processor, or the like. In one embodiment, processing device 1302 may include one or more processing cores. The processing device 1302 is configured to execute the processing logic 1326 for performing the operations and steps discussed herein. In one embodiment, processing device 1302 is the same as processing device 100 described with respect to FIG. 1 that implement techniques for supporting learned branch predictors as described herein with embodiments of the disclosure.

The computer system 1300 may further include a network interface device 1308 communicably coupled to a network 1320. The computer system 1300 also may include a video display unit 1310 (e.g., a liquid crystal display (LCD) or a cathode ray tube (CRT)), an alphanumeric input device 1312 (e.g., a keyboard), a cursor control device 1314 (e.g., a mouse), and a signal generation device 1316 (e.g., a speaker). Furthermore, computer system 1300 may include a graphics-processing unit 1322, a video processing unit 1328, and an audio processing unit 1332.

The data storage device 1318 may include a machine-accessible storage medium 1324 on which is stored software 1326 implementing any one or more of the methodologies of functions described herein, such as implementing silent memory instructions and miss-rate tracking to optimize switching policy on threads in a processing device as described above. The software 1326 may also reside, completely or at least partially, within the main memory 1304 as instructions 1326 and/or within the processing device 1302 as processing logic 1326 during execution thereof by the computer system 1300; the main memory 1304 and the processing device 1302 also constituting machine-accessible storage media. In some embodiments, data storage device 1318 may include a non-transitory computer-readable storage medium, such as computer-readable storage medium 1324, on which may store instructions 1326 encoding any one or more of the methods or functions described herein, including instructions encoding the techniques including the translation controller 180 of FIG. 1 for implementing method 500 of FIG. 5.

The machine-readable storage medium 1324 may also be used to store instructions 1326 implementing silent memory instructions and miss-rate tracking to optimize switching policy on threads in a processing device such as described with respect to processing device 100 in FIG. 1, and/or a software library containing methods that call the above applications. While the machine-accessible storage medium 1328 is shown in an example embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the disclosure. The term "machine-accessible storage medium" shall accordingly be taken to include, but not be limited to, solid-state memories, and optical and magnetic media.

The following examples pertain to further embodiments.

Example 1 includes a processing device comprising: a branch predictor circuit to: obtain a branch history associated with an application, the branch history comprising a plurality of references to branching instructions associated with the application and an outcome of executing each branching instruction; train, using the branch history, a neural network to produce a weighted value for each branch of the branching instructions; identify features of the branching instructions based on the weighted values, each feature to identify predictive information regarding the outcome of at least one branch of correlated branches, the correlated braches having corresponding outcomes; determine a feature vector based on the features, the feature vector comprises a plurality of data fields, wherein each data field identifies an occurrence of a corresponding feature of the correlated branches with respect to the branch history; and produce, using the feature vector, a data model to determine a predicted outcome associated with the correlated branches.

Example 2 includes the processing device of claim 1, wherein to identify the features, the branch prediction circuit is further to determine whether the weighted value for at least one of the features meets a minimum weighted threshold value associated with the correlated branches.

Example 3 includes the processing device of claim 1, wherein each data field further references a location of the occurrence of the corresponding feature in the branch history.

Example 4 includes the processing device of claim 1, wherein each data field further identifies a number of times the occurrence of the corresponding feature is in the branch history.

Example 5 includes the processing device of claim 1, wherein each data field identifies whether the corresponding feature is in or absent from the branch history.

Example 6 includes the processing device of claim 1, further comprising a memory device to implement the data model as a decision tree structure, the decision tree structure comprises branch nodes and leaf nodes, wherein each branch node corresponds to at least one of the correlated branches and each left node corresponds to an outcome for the correlated branches.

Example 7 includes the processing device of claim 6, wherein each leaf node comprises a confidence score that indicates a likelihood of whether a corresponding correlated branch is taken.

Example 8 includes a method comprising: obtaining, by a processing device, a branch history associated with an application, the branch history comprising a plurality of references to branching instructions associated with the application and an outcome of executing each branching instruction; training, using the branch history, a neural network to produce a weighted value for each branch of the branching instructions; identifying, by the processing device, features of the branching instructions based on the weighted values, each feature to identify predictive information regarding the outcome of at least one branch of correlated branches, the correlated braches having corresponding outcomes; determining, by the processing device, a feature vector based on the features, the feature vector comprises a plurality of data fields, wherein each data field identifies an occurrence of a corresponding feature of the correlated branches with respect to the branch history; and producing, using the feature vector, a data model to determine a predicted outcome associated with the correlated branches.

Example 9 includes the method of claim 8, wherein the identifying comprises determining whether the weighted value for at least one of the features meets a minimum weighted threshold value associated with the correlated branches.

Example 10 includes the method of claim 8, wherein each data field further references a location of the occurrence of the corresponding feature in the branch history.

Example 11 includes the method of claim 8, wherein each data field further identifies a number of times the occurrence of the corresponding feature is in the branch history.

Example 12 includes the method of claim 8, wherein each data field identifies whether the corresponding feature is in or absent from the branch history.

Example 13 includes the method of claim 8, further comprising implementing the data model as a decision tree structure, the decision tree structure comprises branch nodes and leaf nodes, wherein each branch node corresponds to at least one of the correlated branches and each left node corresponds to an outcome for the correlated branches.

Example 14 includes the method of claim 13, wherein each leaf node comprises a confidence score that indicates a likelihood of whether a corresponding correlated branch is taken.

Example 15 includes a system comprising: a memory to store a plurality of branching instructions; and a processing device, operatively coupled to the memory, to: obtain a branch history associated with an application, the branch history comprising a plurality of references to branching instructions associated with the application and an outcome of executing each branching instruction; train, using the branch history, a neural network to produce a weighted value for each branch of the branching instructions; identify features of the branching instructions based on the weighted values, each feature to identify predictive information regarding the outcome of at least one branch of correlated branches, the correlated braches having corresponding outcomes; determine a feature vector based on the features, the feature vector comprises a plurality of data fields, wherein each data field identifies an occurrence of a corresponding feature of the correlated branches with respect to the branch history; and produce, using the feature vector, a data model to determine a predicted outcome associated with the correlated branches.

Example 16 includes the system of claim 15, wherein to identify the features, the processing device is further to determine whether the weighted value for at least one of the features meets a minimum weighted threshold value associated with the correlated branches.

Example 17 includes the system of claim 15, wherein each data field further references a location of the occurrence of the corresponding feature in the branch history.

Example 18 includes the system of claim 15, wherein each data field further identifies a number of times the occurrence of the corresponding feature is in the branch history.

Example 19 includes the system of claim 15, wherein each data field identifies whether the corresponding feature is in or absent from the branch history.

Example 20 includes the system of claim 15, wherein the processing device is further to implement the data model as a decision tree structure, the decision tree structure comprises branch nodes and leaf nodes, wherein each branch node corresponds to at least one of the correlated branches and each left node corresponds to an outcome for the correlated branches.

Example 21 includes the system of claim 20, wherein each leaf node comprises a confidence score that indicates a likelihood of whether a corresponding correlated branch is taken.

Example 22 includes a non-transitory computer-readable medium comprising instructions that, when executed by a processing device, cause the processing device to: obtain, by the processing device, a branch history associated with an application, the branch history comprising a plurality of references to branching instructions associated with the application and an outcome of executing each branching instruction; train, using the branch history, a neural network to produce a weighted value for each branch of the branching instructions; identify features of the branching instructions based on the weighted values, each feature to identify predictive information regarding the outcome of at least one branch of correlated branches, the correlated braches having corresponding outcomes; determine a feature vector based on the features, the feature vector comprises a plurality of data fields, wherein each data field identifies an occurrence of a corresponding feature of the correlated branches with respect to the branch history; and produce, using the feature vector, a data model to determine a predicted outcome associated with the correlated branches.

Example 23 includes the non-transitory computer-readable medium of claim 22, wherein to identify the features, the processing device is further to determine whether the weighted value for at least one of the features meets a minimum weighted threshold value associated with the correlated branches.

Example 24 includes the non-transitory computer-readable medium of claim 22, wherein each data field further references a location of the occurrence of the corresponding feature in the branch history.

Example 25 includes the non-transitory computer-readable medium of claim 22, wherein each data field further identifies a number of times the occurrence of the corresponding feature is in the branch history.

Example 26 includes the non-transitory computer-readable medium of claim 22, wherein each data field identifies whether the corresponding feature is in or absent from the branch history.

Example 27 includes the non-transitory computer-readable medium of claim 22, wherein the processing device is further to implement the data model as a decision tree structure, the decision tree structure comprises branch nodes and leaf nodes, wherein each branch node corresponds to at least one of the correlated branches and each left node corresponds to an outcome for the correlated branches.

Example 28 includes the non-transitory computer-readable medium of claim 27, wherein each leaf node comprises a confidence score that indicates a likelihood of whether a corresponding correlated branch is taken.

Example 29 includes a non-transitory, computer-readable storage medium including instructions that, when executed by a processor, cause the processor to perform the method of claims 8-14.

Example 30 includes an apparatus comprising: a plurality of functional units of a processor; means for obtaining a branch history associated with an application, the branch history comprising a plurality of references to branching instructions associated with the application and an outcome of executing each branching instruction; means for training, using the branch history, a neural network to produce a weighted value for each branch of the branching instructions; means for identifying features of the branching instructions based on the weighted values, each feature to identify predictive information regarding the outcome of at least one branch of correlated branches, the correlated braches having corresponding outcomes; means for determining a feature vector based on the features, the feature vector comprises a plurality of data fields, wherein each data field identifies an occurrence of a corresponding feature of the correlated branches with respect to the branch history; and means for producing, using the feature vector, a data model to determine a predicted outcome associated with the correlated branches.

Example 31 includes the apparatus of claim 30, further comprising the subject matter of any of claims 1-7 and 15-21.

Example 32 includes a system comprising: a memory device and a processor comprising a memory controller unit, wherein the processor is configured to perform the method of any of claims 8-14.

Example 33 includes the system of claim 32, further comprising the subject matter of any of claims 1-7 and 15-21.

While the disclosure has been described with respect to a limited number of embodiments, those skilled in the art will appreciate numerous modifications and variations there from. It is intended that the appended claims cover all such modifications and variations as fall within the true spirit and scope of this disclosure.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine-readable medium. A memory or a magnetic or optical storage such as a disc may be the machine-readable medium to store information transmitted via optical or electrical wave modulated or otherwise generated to transmit such information. When an electrical carrier wave indicating or carrying the code or design is transmitted, to the extent that copying, buffering, re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the disclosure.

A module as used herein refers to any combination of hardware, software, and/or firmware. As an example, a module includes hardware, such as a micro-controller, associated with a non-transitory medium to store code to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and/or 'operable to,' in one embodiment, refers to some apparatus, logic, hardware, and/or element designed in such a way to enable use of the apparatus, logic, hardware, and/or element in a specified manner. Note as above that use of to, 'capable to,' or 'operable to,' in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 910 and a hexadecimal letter A. Therefore, a value includes any representation of information capable of being held in a computer system.

Moreover, the values or portions of values may represent states. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Reference throughout this specification to "one embodiment" or "an embodiment" means that a particular feature, structure, or characteristic described in connection with the embodiment is included in at least one embodiment of the disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. A processing device comprising:
 a branch predictor circuit to:
  obtain a branch history associated with an application, the branch history comprising a plurality of references to branching instructions associated with the application and an outcome of executing each branching instruction;
  train, using the branch history, a neural network to produce a weighted value for each branch of the branching instructions;
  identify features of the branching instructions based on the weighted values, each feature to identify predictive information regarding the outcome of at least one branch of correlated branches, the correlated braches having corresponding outcomes;
  determine a feature vector based on the features, the feature vector comprises a plurality of data fields, wherein each data field identifies an occurrence of a corresponding feature of the correlated branches with respect to the branch history;
  generate, using the feature vector, a data model to determine a predicted outcome associated with the correlated branches; and
  implement, by the processing device, the data model to generate the predicted outcome.

2. The processing device of claim 1, wherein to identify the features, the branch prediction circuit is further to determine whether the weighted value for at least one of the features meets a minimum weighted threshold value associated with the correlated branches.

3. The processing device of claim 1, wherein each data field further references a location of the occurrence of the corresponding feature in the branch history.

4. The processing device of claim 1, wherein each data field further identifies a number of times the occurrence of the corresponding feature is in the branch history.

5. The processing device of claim 1, wherein each data field identifies whether the corresponding feature is in or absent from the branch history.

6. The processing device of claim 1, further comprising a memory device to implement the data model as a decision tree structure, the decision tree structure comprises branch nodes and leaf nodes, wherein each branch node corresponds to at least one of the correlated branches and each leaf node corresponds to an outcome for the correlated branches.

7. The processing device of claim 6, wherein each leaf node comprises a confidence score that indicates a likelihood of whether a corresponding correlated branch is taken.

8. A method comprising:
obtaining, by a processing device, a branch history associated with an application, the branch history comprising a plurality of references to branching instructions associated with the application and an outcome of executing each branching instruction;
training, using the branch history, a neural network to produce a weighted value for each branch of the branching instructions;
identifying, by the processing device, features of the branching instructions based on the weighted values, each feature to identify predictive information regarding the outcome of at least one branch of correlated branches, the correlated braches having corresponding outcomes;
determining, by the processing device, a feature vector based on the features, the feature vector comprises a plurality of data fields, wherein each data field identifies an occurrence of a corresponding feature of the correlated branches with respect to the branch history;
generating, using the feature vector, a data model to determine a predicted outcome associated with the correlated branches; and
implementing, by the processing device, the data model to generate the predicted outcome.

9. The method of claim 8, wherein the identifying comprises determining whether the weighted value for at least one of the features meets a minimum weighted threshold value associated with the correlated branches.

10. The method of claim 8, wherein each data field further references a location of the occurrence of the corresponding feature in the branch history.

11. The method of claim 8, wherein each data field further identifies a number of times the occurrence of the corresponding feature is in the branch history.

12. The method of claim 8, wherein each data field identifies whether the corresponding feature is in or absent from the branch history.

13. The method of claim 8, further comprising implementing the data model as a decision tree structure, the decision tree structure comprises branch nodes and leaf nodes, wherein each branch node corresponds to at least one of the correlated branches and each leaf node corresponds to an outcome for the correlated branches.

14. The method of claim 13, wherein each leaf node comprises a confidence score that indicates a likelihood of whether a corresponding correlated branch is taken.

15. A non-transitory computer-readable medium comprising instructions that, when executed by a processing device, cause the processing device to:
obtain, by the processing device, a branch history associated with an application, the branch history comprising a plurality of references to branching instructions associated with the application and an outcome of executing each branching instruction;
train, using the branch history, a neural network to produce a weighted value for each branch of the branching instructions;
identify features of the branching instructions based on the weighted values, each feature to identify predictive information regarding the outcome of at least one branch of correlated branches, the correlated braches having corresponding outcomes;
determine a feature vector based on the features, the feature vector comprises a plurality of data fields, wherein each data field identifies an occurrence of a corresponding feature of the correlated branches with respect to the branch history;
generate, using the feature vector, a data model to determine a predicted outcome associated with the correlated branches; and
implement the data model to generate the predicted outcome.

16. The non-transitory computer-readable medium of claim 15, wherein to identify the features, the processing device is further to determine whether the weighted value for at least one of the features meets a minimum weighted threshold value associated with the correlated branches.

17. The non-transitory computer-readable medium of claim 15, wherein each data field further references a location of the occurrence of the corresponding feature in the branch history.

18. The non-transitory computer-readable medium of claim 15, wherein each data field further identifies a number of times the occurrence of the corresponding feature is in the branch history.

19. The non-transitory computer-readable medium of claim 15, wherein each data field identifies whether the corresponding feature is in or absent from the branch history.

20. The non-transitory computer-readable medium of claim 15, wherein the processing device is further to implement the data model as a decision tree structure, the decision tree structure comprises branch nodes and leaf nodes, wherein each branch node corresponds to at least one of the correlated branches and each leaf node corresponds to an outcome for the correlated branches.

* * * * *